United States Patent
Matsuoka et al.

(10) Patent No.: US 10,089,980 B2
(45) Date of Patent: Oct. 2, 2018

(54) SOUND REPRODUCTION METHOD, SPEECH DIALOGUE DEVICE, AND RECORDING MEDIUM

(71) Applicant: Panasonic Intellectual Property Management Co., Ltd., Osaka (JP)

(72) Inventors: Tomomi Matsuoka, Osaka (JP); Atsushi Sakaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/130,942

(22) Filed: Apr. 16, 2016

(65) Prior Publication Data

US 2016/0314785 A1 Oct. 27, 2016

(30) Foreign Application Priority Data

Apr. 24, 2015 (JP) ................................ 2015-089241
Jan. 19, 2016 (JP) ................................ 2016-008005

(51) Int. Cl.
*G10L 15/22* (2006.01)
*G10L 21/0216* (2013.01)

(52) U.S. Cl.
CPC .......... *G10L 15/22* (2013.01); *G10L 21/0216* (2013.01); *G10L 2021/02166* (2013.01)

(58) Field of Classification Search
USPC .......................... 704/246, 247, 251, 252, 275
See application file for complete search history.

(56) References Cited

U.S. PATENT DOCUMENTS

| | | | | |
|---|---|---|---|---|
| 2007/0025560 A1* | 2/2007 | Asada | ............... | G10K 15/12 381/61 |
| 2008/0089522 A1* | 4/2008 | Baba | ............... | H04S 7/305 381/17 |
| 2009/0043411 A1* | 2/2009 | Yamada | ............... | H04S 1/005 700/94 |
| 2012/0219165 A1* | 8/2012 | Yamada | ............... | H04R 1/1091 381/310 |
| 2013/0121516 A1* | 5/2013 | Lamb | ............... | H04S 7/302 381/307 |

(Continued)

FOREIGN PATENT DOCUMENTS

| | | |
|---|---|---|
| JP | 2001-095082 | 4/2001 |
| JP | 2006-270876 | 10/2006 |

*Primary Examiner* — Leonard Saint Cyr
(74) *Attorney, Agent, or Firm* — Greenblum & Bernstein, P.L.C.

(57) ABSTRACT

A sound reproduction method is provided. The method includes acquiring ambient sound information that includes voice spoken to a speech dialog system and indicates sound around a speaking person who has spoken the voice. The method also includes separating the ambient sound information into first sound information including the spoken voice and second sound information including sound other than the spoken voice. The method further includes comparing the sound level of the first sound information with the sound level of the second sound information, and reproducing an audio response to the spoken voice, by selecting one of a first reproduction method and a second reproduction method that is different in terms of directivity of reproduced sound from the first reproduction method in accordance with a result of the comparison.

19 Claims, 13 Drawing Sheets

(56) References Cited

U.S. PATENT DOCUMENTS

| | | | |
|---|---|---|---|
| 2014/0241551 A1* | 8/2014 | Kim | H04R 3/12 |
| | | | 381/306 |
| 2014/0270200 A1* | 9/2014 | Usher | H04R 1/1041 |
| | | | 381/57 |
| 2015/0170645 A1* | 6/2015 | Di Censo | G10L 15/22 |
| | | | 704/275 |

* cited by examiner

SOUND REPRODUCTION METHOD, SPEECH DIALOGUE DEVICE, AND RECORDING MEDIUM

BACKGROUND

1. Technical Field

The present disclosure relates to a sound reproduction method, a speech dialogue device, and a recording medium, each of which is for reproducing an audio response to spoken voice.

2. Description of the Related Art

Conventionally, a technique for estimating a direction in which a speaking person is present on the basis of a signal indicative of speaking person's voice picked up by using a plurality of microphones disposed in an array and then reproducing an audio response by causing a plurality of speakers disposed in an array to have directivity toward the speaking person in a dialogue system has been proposed.

For example, Japanese Unexamined Patent Application Publication No. 2006-270876 discloses a sound input device that includes a microphone array made up of a plurality of microphones disposed in an array, a speaker array made up of a plurality of speakers disposed in an array, and a control unit that controls the speaker array to have directivity toward a speaking person on the basis of information on a direction in which the speaking person is present that is detected by the microphone array.

For example, Japanese Unexamined Patent Application Publication No. 2001-95082 discloses a directional loudspeaker that transmits different pieces of sound information to a plurality of listening areas so that sound from a certain signal source is inaudible in a predetermined listening area or so that different sounds are audible in different listening areas in a directional loudspeaker control system that allows sounds from different signal sources are audible in different regions by using a plurality of speakers.

SUMMARY

In one general aspect, the techniques disclosed here feature a sound reproduction method in a speech dialogue system, including: acquiring ambient sound information that includes voice spoken to the speech dialogue system and indicates sound around a speaking person who has spoken the voice; separating the ambient sound information into first sound information including the spoken voice and second sound information including sound other than the spoken voice; comparing a sound level of the first sound information with a sound level of the second sound information; and reproducing an audio response to the spoken voice by selecting one of a first reproduction method and a second reproduction method that is different in terms of directivity of reproduced sound from the first reproduction method in accordance with a result of the comparing, wherein at least one of the acquiring, the separating, the comparing and the reproducing is performed by a processor.

According to the present disclosure, it is possible to reproduce an audio response by using a reproduction method according to a situation around a speaking person.

It should be noted that general or specific embodiments may be implemented as a system, a device, an integrated circuit, a computer program, a computer-readable recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
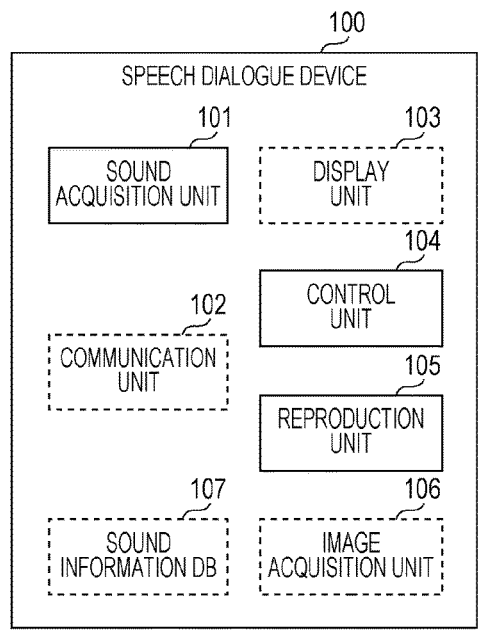
FIG. 1 is a diagram illustrating a configuration of a speech dialogue device according to an embodiment of the present disclosure.

Underlying Knowledge Forming Basis of the Present Disclosure

In general, in a case where a speaking person controls an apparatus by speaking an audio command to a speech dialogue system, it is assumed that the speech dialogue system is used under a noise environment in which ambient noise or voice of a speaking person other than the speaking person who speaks the audio command to the speech dialogue system is mixed. In view of this, a technique for reproducing an audio response toward only a person who is holding a dialogue with a speech dialogue system by giving directivity to the audio response from the speech dialogue system has been considered. For example, in a case where there are a plurality of persons in front of a speech dialogue system and where only a speaking person wants to hear an audio response to spoken voice, use of a general reproduction method having no directivity makes it hard for the speaking person to hear the audio response due to noise such as ambient noise or allows a person who should not hear the audio response to hear the audio response. In view of this, for example, a technique of reproducing an audio response by causing a speaker to have directivity toward only a specific person such as the technique disclosed in Japanese Unexamined Patent Application Publication No. 2006-270876 is effective.

However, use of the device disclosed in Japanese Unexamined Patent Application Publication No. 2006-270876 has a risk of occurrence of the following problem. According to the technique of reproducing an audio response having directivity toward only a specific person who has spoken as in Japanese Unexamined Patent Application Publication No. 2006-270876, for example, in a case where there are a plurality of persons in front of a speech dialogue system and where all of the persons want to hear an audio response to spoken voice, persons other than the speaking person who want to heat the audio response undesirably cannot hear the audio response.

That is, the device of Japanese Unexamined Patent Application Publication No. 2006-270876 cannot reproduce an audio response by using an optimum reproduction method according to a situation around a speaking person. Similarly, the device of Japanese Unexamined Patent Application Publication No. 2001-95082 does not consider reproduction of an audio response using an optimum reproduction method according to a situation around a speaking person.

In the conventional devices, since a reproduced audio response always has directivity toward only a speaking person, there are cases where a problem occurs in a speech dialogue system. For example, in a case where a person who wants to hear (a person who should hear) and audio response is not within a directivity area, this person undesirably cannot hear the audio response, and in a case where a person who does not want to hear (a person who should not hear) the audio response is within the directivity area, this person undesirably hears the audio response.

A sound reproduction method according to an aspect of the present disclosure is a sound reproduction method in a speech dialogue system, including: acquiring ambient sound information that includes voice spoken to the speech dialogue system and indicates sound around a speaking person who has spoken the voice; separating the ambient sound information into first sound information including the spoken voice and second sound information including sound other than the spoken voice; comparing a sound level of the first sound information with a sound level of the second sound information; and reproducing an audio response to the spoken voice by selecting one of a first reproduction method and a second reproduction method that is different in terms of directivity of reproduced sound from the first reproduction method in accordance with a result of the comparing, wherein at least one of the acquiring, the separating, the comparing and the reproducing is performed by a processor.

According to the arrangement, ambient sound information that includes voice spoken to the speech dialogue system and indicates sound around a speaking person who has spoken the voice is acquired. The ambient sound information is separated into first sound information including the spoken voice and second sound information including sound other than the spoken voice. The sound level of the first sound information and the sound level of the second sound information are compared. An audio response is reproduced by selecting one of a first reproduction method and a second reproduction method that is different in terms of directivity of reproduced sound from the first reproduction method in accordance with a result of the comparison.

Since an audio response is reproduced by selecting one of a first reproduction method and a second reproduction method that is different in terms of directivity of reproduced sound from the first reproduction method in accordance with a result of comparison between the sound level of the first sound information including the voice spoken to the speech dialogue system and the sound level of the second sound information including sound other than the spoken voice, the audio response can be reproduced by selecting a reproduction method according to a situation around the speaking person.

The sound reproduction method may be arranged such that the first reproduction method is a reproduction method having no directivity; the second reproduction method is a reproduction method having directivity toward the speaking person; the audio response is reproduced by selecting the first reproduction method in a case where the sound level of the first sound information is higher than that of the second sound information; and the audio response is reproduced by selecting the second reproduction method in a case where the sound level of the first sound information is lower than that of the second sound information.

According to the arrangement, the first reproduction method is a reproduction method having no directivity, and the second reproduction method is a reproduction method having directivity toward the speaking person. The audio response is reproduced by selecting the first reproduction method in a case where the sound level of the first sound information is higher than the sound level of the second sound information, and the audio response is reproduced by selecting the second reproduction method in a case where the sound level of the first sound information is lower than the sound level of the second sound information.

In a case where the sound level of the first sound information is higher than that of the second sound information, it is assumed that a person other than the speaking person is trying not to emit sound in order to confirm an audio response. Accordingly, in a case where the sound level of the first sound information is higher than that of the second sound information, an audio response is reproduced by selecting a reproduction method having no directivity. This allows the person other than the speaking person to also hear the audio response.

In a case where the sound level of the first sound information is lower than that of the second sound information, it is assumed that a person other than the speaking person is emitting sound because the person other than the speaking person is not interested in an audio response. Accordingly, in a case where the sound level of the first sound information is lower than that of the second sound information, an audio response is reproduced by selecting a reproduction method having directivity toward the speaking person. This allows only the speaking person to hear the audio response.

The sound reproduction method may be arranged to further include: performing sound recognition on the first sound information; generating the audio response by using a result of the sound recognition; and reproducing the audio response by selecting one of the first reproduction method and the second reproduction method.

According to the arrangement, sound recognition is performed on the separated first sound information. An audio response is generated by using a result of the sound recognition. The generated audio response is reproduced by selecting one of the first reproduction method and the second reproduction method.

Therefore, an audio response can be generated by using a result of sound recognition performed on the first sound information.

The sound reproduction method may be arranged such that the ambient sound information includes a plurality of pieces of ambient sound information having directivity in respective predetermined angles that are acquired from an array microphone system including a plurality of microphones; and each of the plurality of pieces of ambient sound information is separated into the first sound information and the second sound information by determining whether or not each of the plurality of pieces of ambient sound information is the voice spoken to the speech dialogue system.

According to the arrangement, the ambient sound information includes a plurality of pieces of ambient sound information having directivity in respective predetermined angles that are acquired by an array microphone system including a plurality of microphones. Each of the plurality of pieces of ambient sound information is separated into the first sound information and the second sound information by determining whether or not each of the plurality of pieces of ambient sound information is the voice spoken to the speech dialogue system.

The sound reproduction method may be arranged such that in a case where the audio response is reproduced by selecting the second reproduction method, the audio response is reproduced toward an angle in which a piece of ambient sound information determined as the voice spoken to the speech dialogue system among the plurality of pieces of ambient sound information has been acquired.

According to the arrangement, in a case where the audio response is reproduced by selecting the second reproduction method, the audio response is reproduced toward an angle in which a piece of ambient sound information determined as the voice spoken to the speech dialogue system among the plurality of pieces of ambient sound information has been acquired. This makes it possible to reproduce the audio response toward the speaking person with certainty.

The sound reproduction method may be arranged to further include: determining that the ambient sound information is voice spoken to the speech dialogue system in a case where any of the plurality of pieces of the ambient sound information includes a predetermined keyword that is stored in advance.

According to the arrangement, it is determined whether or not each of the plurality of pieces of ambient sound information includes a predetermined keyword that is stored in advance. In a case where ambient sound information includes the predetermined keyword, it is determined that the ambient sound information is voice spoken to the speech dialogue system.

It is therefore possible to separate the first sound information including the voice spoken to the speech dialogue system from the plurality of pieces of ambient sound information.

The sound reproduction method may be arranged such that the ambient sound information is separated into the first sound information and the second sound information by using a spectral subtraction method.

According to the arrangement, the ambient sound information can be separated into the first sound information and the second sound information by using a spectral subtraction method.

The sound reproduction method may be arranged to further include: identifying a person around the speech dialogue system on the basis of the ambient sound information; and selecting one of the first reproduction method and the second reproduction method to be used to reproduce the audio response on the basis of a result of the comparing the sound level of the first sound information and the sound level of the second sound information and a result of the identifying the person around the speech dialogue system.

According to the arrangement, a person around the speaking person is identified on the basis of the ambient sound information. Which of the first reproduction method and the second reproduction method is used to reproduce the audio response is selected on the basis of a result of the comparison between the sound level of the first sound information and the sound level of the second sound information and a result of the identification of the person around the speaking person.

It is therefore possible to select which of a reproduction method having no directivity and a reproduction method having directivity toward a speaking person is used to reproduce an audio response on the basis of a person around the speaking person.

The sound reproduction method may be arranged such that a reproduction method for reproducing the audio response is selected by using a table in which the first sound information acquired previously and one of the first reproduction method and the second reproduction method selected to reproduce the first sound information acquired previously are stored in association with each other.

According to the arrangement, a reproduction method for reproducing the audio response is selected by using a table in which the first sound information acquired previously and one of the first reproduction method and the second reproduction method selected to reproduce the first sound information acquired previously are stored in association with each other.

It is therefore possible to shorten a processing period required to determine a reproduction method because the reproduction method is selected on the basis of a past history.

The sound reproduction method may be arranged to further include: acquiring an image around the speech dialogue system; detecting a person who is paying attention to the speech dialogue system on the basis of the image; and reproducing the audio response toward the detected person in a case where the audio response is reproduced by selecting the second reproduction method.

According to the arrangement, an image around the speech dialogue system is acquired, and a person who is paying attention to the speech dialogue system is detected on the basis of the image. The audio response is reproduced toward the detected person in a case where the audio response is reproduced by selecting the second reproduction method.

Since it is likely that a person who is paying attention to the speech dialogue system is interested in an audio response, the audio response can be reproduced toward the person who is paying attention to the speech dialogue system.

The sound reproduction method may be arranged such that the first reproduction method is a reproduction method having no directivity; the second reproduction method is a reproduction method having directivity toward a speaking person; the sound reproduction method further includes: acquiring an image around the speech dialogue system; detecting the number of persons who are paying attention to the speech dialogue system on the basis of the image; determining whether or not a plurality of persons are paying attention to the speech dialogue system on the basis of a result of the detecting the number of persons; reproducing the audio response by using the first reproduction method in a case where it is determined that a plurality of persons are paying attention to the speech dialogue system; and reproducing the audio response by selecting the second reproduction method in a case where it is determined that a plurality of persons are not paying attention to the speech dialogue system.

According to the arrangement, the first reproduction method is a reproduction method having no directivity, and the second reproduction method is a reproduction method having directivity toward a speaking person. An image around the speech dialogue system is acquired, and the number of persons who are paying attention to the speech dialogue system is detected on the basis of the image. It is determined whether or not a plurality of persons are paying attention to the speech dialogue system on the basis of a result of the detection of the number of persons. The audio response is reproduced by selecting the first reproduction method in a case where it is determined that a plurality of persons are paying attention to the speech dialogue system. The audio response is reproduced by selecting the second reproduction method in a case where it is determined that a plurality of persons are not paying attention to the speech dialogue system.

Therefore, in a case where a plurality of persons are paying attention to the speech dialogue system, an audio response can be reproduced by selecting a reproduction method having no directivity so that the plurality of persons can hear the audio response, whereas in a case where a plurality of persons are not paying attention to the speech dialogue system, i.e., in a case where only a speaking person is paying attention to the speech dialogue system, the audio response can be reproduced by selecting a reproduction method having directivity toward the speaking person.

The sound reproduction method may be arranged such that the first reproduction method is a reproduction method having no directivity; the second reproduction method is a reproduction method having directivity toward a speaking person; the sound reproduction method further includes: picking up the spoken voice by using a sound pickup device held by the speaking person; acquiring an image around the speech dialogue system; specifying a position of the speaking person who has spoken to the sound pickup device on the basis of the image; determining whether or not the spoken voice has been picked up while a predetermined instruction signal is being input to the sound pickup device by the speaking person; reproducing the audio response by selecting the first reproduction method in a case where it is determined that the spoken voice has not been picked up while the predetermined instruction signal is being input to the sound pickup device; and reproducing the audio response by selecting the second reproduction method in a case where it is determined that the spoken voice has been picked up while the predetermined instruction signal is being input to the sound pickup device.

According to the arrangement, the first reproduction method is a reproduction method having no directivity, and the second reproduction method is a reproduction method having directivity toward a speaking person. The spoken voice is picked up by using a sound pickup device held by the speaking person. An image around the speech dialogue system is acquired, and the position of the speaking person who has spoken to the sound pickup device is specified on the basis of the image. It is determined whether or not the spoken voice has been picked up while a predetermined instruction signal is being input to the sound pickup device by the speaking person. The audio response is reproduced by selecting the first reproduction method in a case where it is determined that the spoken voice has not been picked up while the predetermined instruction signal is being input to the sound pickup device. The audio response is reproduced by selecting the second reproduction method in a case where it is determined that the spoken voice has been picked up while the predetermined instruction signal is being input to the sound pickup device.

Since an audio response is reproduced toward a speaking person only in a case where voice has been spoken while a predetermined instruction signal is being input to the sound pickup device by the speaking person, the audio response can be reproduced by selecting a reproduction method reflecting intention of the speaking person.

The sound reproduction method may be arranged such that the first reproduction method is a reproduction method having no directivity; the second reproduction method is a reproduction method having directivity toward a speaking person; the ambient sound information includes a plurality of pieces of ambient sound information having directivity in respective predetermined angles that are acquired from an array microphone system including a plurality of microphones; the sound reproduction method further includes: separating each of the plurality of pieces of ambient sound information into the first sound information and the second sound information by determining whether or not each of the plurality of pieces of ambient sound information is the voice spoken to the speech dialogue system; specifying a position of the speaking person on the basis of directivity of a microphone that has acquired ambient sound information including the first sound information; determining whether or not one of the first reproduction method and the second reproduction method is associated with the specified position of the speaking person by referring to a sound information database in which the position of the speaking person and one of the first reproduction method and the second reproduction method are stored in association with each other; reproducing the audio response by selecting one of the first reproduction method and the second reproduction method that is associated with the specified position of the speaking person in a case where it is determined that the one of the first reproduction method and the second reproduction method is associated with the specified position of the speaking person; comparing the sound level of the first sound information and the sound level of the second sound information in a case where it is determined that neither the first reproduction method nor the second reproduction method is associated with the specified position of the speaking person; reproducing the audio response by selecting the first reproduction method in a case where the sound level of the first sound information is higher than that of the second sound information; reproducing the audio response by selecting the second reproduction method in a case where the sound level of the first sound information is lower than that of the second sound information; and storing, in the sound information database, the specified position of the speaking person and the one of the first reproduction method and the second reproduction method used to reproduce the audio response in association with each other.

According to the arrangement, the first reproduction method is a reproduction method having no directivity, and the second reproduction method is a reproduction method having directivity toward a speaking person. The ambient sound information includes a plurality of pieces of ambient sound information having directivity in respective predetermined angles that are acquired from an array microphone system including a plurality of microphones. Each of the plurality of pieces of ambient sound information is separated into the first sound information and the second sound information by determining whether or not each of the plurality of pieces of ambient sound information is the voice spoken to the speech dialogue system. The position of the speaking person is specified on the basis of directivity of a microphone that has acquired ambient sound information including the first sound information. It is determined whether or not one of the first reproduction method and the second reproduction method is associated with the specified position of the speaking person by referring to a sound information database in which the position of the speaking person and one of the first reproduction method and the second reproduction method are stored in association with each other. The audio response is reproduced by selecting one of the first reproduction method and the second reproduction method that is associated with the specified position of the speaking person in a case where it is determined that the one of the first reproduction method and the second reproduction method is associated with the specified position of the speaking person. The sound level of the first sound information and the sound level of the second sound information are compared in a case where it is determined that neither the first reproduction method nor the second reproduction method is associated with the specified position of the speaking person. The audio response is reproduced by selecting the first reproduction method in a case where the sound level of the first sound information is higher than that of the second sound information. The audio response is reproduced by selecting the second reproduction method in a case where the sound level of the first sound information is lower than that of the second sound information. The specified position of the speaking person and the one of the first reproduction method and the second reproduction method used to reproduce the audio response are stored in association with each other in the sound information database.

Therefore, the position of a speaking person and a reproduction method are stored in advance in association with each other in a sound information database, and in a case where the position of a speaking person is the same as that stored in advance in the sound information database, a reproduction method associated with the stored position of the speaking person can be selected. This makes it possible to shorten a processing period required to determine the reproduction method.

The sound reproduction method may be arranged to further include: identifying a speaking person who has spoken the voice; selecting one of the first reproduction method and the second reproduction method that is associated with the identified speaking person in a sound information database in which information for identifying the speaking person and one of the first reproduction method and the second reproduction method are stored in association with each other; and reproducing the audio response by using the one of the first reproduction method and the second reproduction method.

According to the arrangement, a speaking person who has spoken the voice is identified. One of the first reproduction method and the second reproduction method that is associated with the identified speaking person is selected in a sound information database in which information for identifying the speaking person and one of the first reproduction method and the second reproduction method are stored in association with each other. The audio response is reproduced by using the one of the first reproduction method and the second reproduction method.

Therefore, information for identifying a speaking person and a reproduction method are stored in advance in association with each other in a sound information database, and in a case where an identified speaking person is the same as the information for identifying a speaking person stored in advance in the sound information database, a reproduction method associated with the stored information for identifying a speaking person can be selected. This makes it possible to shorten a processing period required to determine the reproduction method.

The sound reproduction method may be arranged such that the first reproduction method is a reproduction method having no directivity; the second reproduction method is a reproduction method having directivity toward a speaking person; the sound reproduction method further includes: determining whether or not the separated first sound information includes a predetermined keyword stored in advance in a storage; reproducing the audio response by selecting the first reproduction method in a case where it is determined that the first sound information includes the predetermined keyword; and reproducing the audio response by selecting the second reproduction method in a case where it is determined that the separated first sound information does not include the predetermined keyword.

According to the arrangement, the first reproduction method is a reproduction method having no directivity, and the second reproduction method is a reproduction method having directivity toward a speaking person. It is determined whether or not the separated first sound information includes a predetermined keyword stored in advance in a storage. The audio response is reproduced by selecting the first reproduction method in a case where it is determined that the first sound information includes the predetermined keyword. The audio response is reproduced by selecting the second reproduction method in a case where it is determined that the separated first sound information does not include the predetermined keyword.

Therefore, a reproduction method can be easily determined because the reproduction method is determined on the basis of whether or not first sound information includes a predetermined keyword stored in advance in a storage.

The sound reproduction method may be arranged to further include: analyzing contents of the spoken voice of the separated first sound information and then determining whether or not the analyzed contents of the spoken voice are the same as those of first sound information acquired last time; omitting reproduction of the audio response in a case where it is determined that the analyzed contents of the spoken voice are the same as those of the first sound information acquired last time; comparing the sound level of the first sound information with the sound level of the second sound information in a case where it is determined that the analyzed contents of the spoken voice are not the same as those of the first sound information acquired last time and then reproducing the audio response by selecting one of the first reproduction method and the second reproduction method in accordance with a result of the comparing; and storing the analyzed contents of the spoken voice in the storage.

According to the arrangement, contents of the spoken voice of the separated first sound information are analyzed, and it is determined whether or not the analyzed contents of the spoken voice are the same as those of first sound information acquired last time. Reproduction of the audio response is omitted in a case where it is determined that the analyzed contents of the spoken voice are the same as those of the first sound information acquired last time. The sound level of the first sound information and the sound level of the second sound information are compared in a case where it is determined that the analyzed contents of the spoken voice are not the same as those of the first sound information acquired last time. The audio response is reproduced by selecting one of the first reproduction method and the second reproduction method in accordance with a result of the comparison. The analyzed contents of the spoken voice are stored in the storage.

It is therefore possible to cancel unnecessary reproduction of an audio response because reproduction of an audio response to voice spoken for the second time can be omitted, for example, in a case where the audio response is hard to hear due to large noise around a speaking person.

The sound reproduction method may be arranged such that the first reproduction method is a reproduction method having no directivity; the second reproduction method is a reproduction method having directivity toward a speaking person; the sound reproduction method further includes: accumulating, in a sound level database, a sound level of human voice included in the separated second sound information as a normal sound level; determining whether or not the sound level of the separated first sound information is higher than an average of the normal sound level accumulated in the sound level database; reproducing the audio response by selecting the first reproduction method in a case where it is determined that the sound level of the first sound information is higher than the average of the normal sound level; and reproducing the audio response by selecting the second reproduction method in a case where it is determined that the sound level of the first sound information is lower than the average of the normal sound level.

According to the arrangement, the first reproduction method is a reproduction method having no directivity, and the second reproduction method is a reproduction method having directivity toward a speaking person. A sound level of human voice included in the separated second sound information is accumulated as a normal sound level in a sound level database. It is determined whether or not a sound level of the separated first sound information is higher than an average of normal sound levels accumulated in the sound level database. The audio response is reproduced by selecting the first reproduction method in a case where it is determined that the sound level of the first sound information is higher than the average of the normal sound levels. The audio response is reproduced by selecting the second reproduction method in a case where it is determined that the sound level of the first sound information is lower than the average of the normal sound levels.

It is therefore possible to determine a reproduction method by comparing the sound level of spoken voice of an instruction to the speech dialogue system and the sound level of voice spoken by a speaking person during normal conversation.

The sound reproduction method may be arranged to further include: comparing the sound level of the first sound information with the sound level of the second sound information and then reproducing sound reproduced by a device controlled by the spoken voice by selecting one of the first reproduction method and the second reproduction method in accordance with a result of the comparing.

According to the arrangement, sound reproduced by a device controlled by the spoken voice is reproduced by selecting one of the first reproduction method and the second reproduction method in accordance with a result of comparison between the sound level of the first sound information and the sound level of the second sound information.

It is therefore possible to control not only an audio response to spoken voice, but also a reproduction method for reproducing sound reproduced by a device controlled by the spoken voice.

A speech dialogue device according to another aspect of the present disclosure is a speech dialogue device including: a sound separator that separates ambient sound information including voice spoken to the speech dialogue device and indicating sound around a speaking person who has spoken the voice into first sound information including the spoken voice and second sound information including sound other than the spoken voice; a comparator that compares a sound level of the first sound information with a sound level of the second sound information; and a reproduction controller that reproduces an audio response to the spoken voice by selecting one of a first reproduction method and a second reproduction method that is different in terms of directivity of reproduced sound from the first reproduction method in accordance with a result of the comparison, wherein at least one of the sound separator, the comparator and the reproduction controller includes a processor.

According to the arrangement, ambient sound information that includes voice spoken to the speech dialogue device and indicates sound around a speaking person who has spoken the voice is acquired. The ambient sound information is separated into first sound information including the spoken voice and second sound information including sound other than the spoken voice. The sound level of the first sound information and the sound level of the second sound information are compared. An audio response is reproduced by selecting one of a first reproduction method and a second reproduction method that is different in terms of directivity of reproduced sound from the first reproduction method in accordance with a result of the comparison.

Since an audio response is reproduced by using one of a first reproduction method and a second reproduction method that is different in terms of directivity of reproduced sound from the first reproduction method in accordance with a result of comparison between the sound level of the first sound information including the voice spoken to the speech dialogue device and the sound level of the second sound information including sound other than the spoken voice, the audio response can be reproduced by using a reproduction method according to a situation around the speaking person.

A non-transitory computer-readable recording medium according to another aspect of the present disclosure is a non-transitory computer-readable recording medium storing a program, the program causing a computer to: separate ambient sound information that includes voice spoken to the computer and indicates sound around a speaking person who has spoken the voice into first sound information including the spoken voice and second sound information including sound other than the spoken voice; compare a sound level of the first sound information with a sound level of the second sound information; and reproduce an audio response to the spoken voice by selecting one of a first reproduction method and a second reproduction method that is different in terms of directivity of reproduced sound from the first reproduction method in accordance with a result of the comparison.

According to the arrangement, ambient sound information that includes voice spoken to the speech dialogue device and indicates sound around a speaking person who has spoken the voice is acquired. The ambient sound information is separated into first sound information including the spoken voice and second sound information including sound other than the spoken voice. The sound level of the first sound information and the sound level of the second sound information are compared. An audio response is reproduced by using one of a first reproduction method and a second reproduction method that is different in terms of directivity of reproduced sound from the first reproduction method in accordance with a result of the comparison.

Since an audio response is reproduced by using one of a first reproduction method and a second reproduction method that is different in terms of directivity of reproduced sound from the first reproduction method in accordance with a result of comparison between the sound level of the first sound information including the voice spoken to the speech dialogue device and the sound level of the second sound information including sound other than the spoken voice, the audio response can be reproduced by using a reproduction method according to a situation around the speaking person.

A speech dialogue device or a speech dialogue system in an embodiment of the present disclosure is described with reference to the drawings. The embodiment described below is a specific example of the present disclosure. Numerical values, shapes, constituent elements, steps, the order of steps, and the like described in the embodiment below are examples of the present disclosure and do not limit the present disclosure. Among the constituent elements in the embodiment below, constituent elements that are not described in the independent claims that show highest concepts of the present disclosure are described as optional constituent elements. The contents in all of the embodiments can be combined.

It should be noted that general or specific embodiments may be implemented as a system, a method, an integrated circuit, a computer program, a computer-readable recording medium such as a CD-ROM, or any selective combination thereof.

Configuration of Speech Dialogue Device

FIG. 1 is a diagram illustrating a configuration of a speech dialogue device according to an embodiment of the present disclosure. A speech dialogue device 100 illustrated in FIG. 1 is configured to include all constituent elements described in the present embodiment. Another example of the configuration will be described later with reference to FIG. 4. The configuration of the speech dialogue device 100 illustrated in FIG. 1 is an example, and the speech dialogue device 100 may include a constituent element other than the constituent elements illustrated in FIG. 1, and one or more of the constituent elements may be missing.

FIG. 1 illustrates an example of a configuration of the speech dialogue device 100 according to one aspect of the present embodiment. The speech dialogue device 100 includes a sound acquisition unit 101, a communication unit 102, a display unit 103, a control unit 104, a reproduction unit 105, an image acquisition unit 106, and a sound information DB (database) 107. Note that each of these constituent elements need not necessarily be provided in the speech dialogue device 100. For example, the communication unit 102, the display unit 103, the image acquisition unit 106, or the sound information DB 107 is not an essential constituent element of the speech dialogue device 100. Furthermore, it is possible to employ an arrangement in which the sound acquisition unit 101 is provided in an external device provided outside the speech dialogue device 100, and the speech dialogue device 100 and the external device are connected by a cable or by radio. The number of speech dialogue devices 100 is not limited to one per household and can be more than one per household.

The speech dialogue device 100 may be, for example, a household electrical appliance such as a television set or may be a special device having a microphone, a speaker, or a camera.

First, each of the constituent elements of the speech dialogue device 100 according to one aspect of the present embodiment is described with reference to FIG. 1.

The sound acquisition unit 101 is, for example, a microphone. Examples of sound acquired by the sound acquisition unit 101 include voice of a speaking person who speaks an audio command to the speech dialogue device 100 (speech dialogue system) during use of the speech dialogue device 100, voice of a person other than the speaking person who speaks the audio command to the speech dialogue device 100 (speech dialogue system), noise emitted from an apparatus around the speaking person, and ambient noise such as noise that occurs due to daily activities.

It is desirable that the sound acquisition unit 101 include a directivity control unit that controls directivity in acquisition of sound and a signal processing unit (not illustrated) that performs sound source separation on the acquired sound. This makes it possible to acquire (separate) sound in each sound arrival direction (region), thereby allowing an improvement in accuracy of separation into spoken voice of the speaking person who has spoken the audio command, voice of the person other than the speaking person, and ambient noise. Note that the signal processing unit (not illustrated) may be included in the control unit 104.

The communication unit 102 transmits and receives various kinds of information by communicating with another apparatus or a server device connected over a network such as the Internet. As described above, the communication unit 102 is not an essential constituent element of the speech dialogue device 100.

The display unit 103 displays various kinds of information. The display unit 103 can be a general display, and therefore description thereof is omitted. As described above, the display unit 103 is not an essential constituent element of the speech dialogue device 100.

The control unit 104 is, for example, a CPU (Central Processing Unit), a processor, or a microcomputer. The control unit 104 controls another apparatus and has functions of sound recognition processing, image processing, picked-up sound signal processing, and the like. The control unit 104 controls operations of the constituent elements such as the sound acquisition unit 101 and the display unit 103. The control unit 104 need not be physically assembled as a single control unit, and in a case where a plurality of control units that are physically separate units are provided, all of the plurality of control units are included in the control unit 104. Functions of the control unit 104 will be described later.

The reproduction unit 105 reproduces a signal controlled by the control unit 104. The reproduction unit 105 is, for example, a speaker (array speaker) including a plurality of speaker units disposed in an array. The reproduction unit 105 can be any speaker that can control directivity of a reproduced audio response. The reproduction unit 105 need not be provided in the speech dialogue device 100. For example, the reproduction unit 105 may be an external speaker, and the reproduction unit 105 and the speech dialogue device 100 may be connected by a cable or by radio.

The image acquisition unit 106 is, for example, a camera of a television set in a case where the speech dialogue device 100 is the television set. In a case where the position of the speaking person who speaks to the speech dialogue device 100 is specified, an audio response can be precisely given back to the position of the speaking person by giving the audio response directivity toward the position of the speaking person. It is therefore possible to improve accuracy of sound recognition. As described above, in the present embodiment, the image acquisition unit 106 is not an essential constituent element of the speech dialogue device 100. Details of the method for giving an audio response directivity toward the position of a speaking person who speaks to the speech dialogue device 100 by using the image acquisition unit 106 will be described in Embodiment 2.

The sound information DB 107 accumulates therein an audio command or sound information of voice that is spoken by the speaking person who speaks to the speech dialogue device 100 and that is acquired by the sound acquisition unit 101. In the sound information DB 107, personal characteristics of a voice signal including the number of times of utterance or the sound level of an audio command spoken by the speaking person who speaks to the speech dialogue device 100 may be managed and accumulated in association with the speaking person. In a case where these pieces of information are managed and accumulated in the sound information DB 107, the control unit 104 can grasp what time and how often the speech dialogue device 100 is used by the speaking person who speaks to the speech dialogue device 100 or how the level of the ambient noise fluctuates by analyzing characteristics of an audio command that is spoken by the speaking person who speaks to the speech dialogue device 100 and that is acquired by the sound acquisition unit 101 and then examining an audio command having the same sound level or characteristics as this audio command among audio commands accumulated in the sound information DB 107. This makes it possible to respond to the audio command by adjusting the sound volume by using a reproduction method according to a time when or an environment or situation where the audio command is spoken to the speech dialogue device 100 by the speaking person. As described above, the sound information DB 107 is not an essential constituent element of the speech dialogue device 100.

Functional Elements of Control Unit

Figure 2:
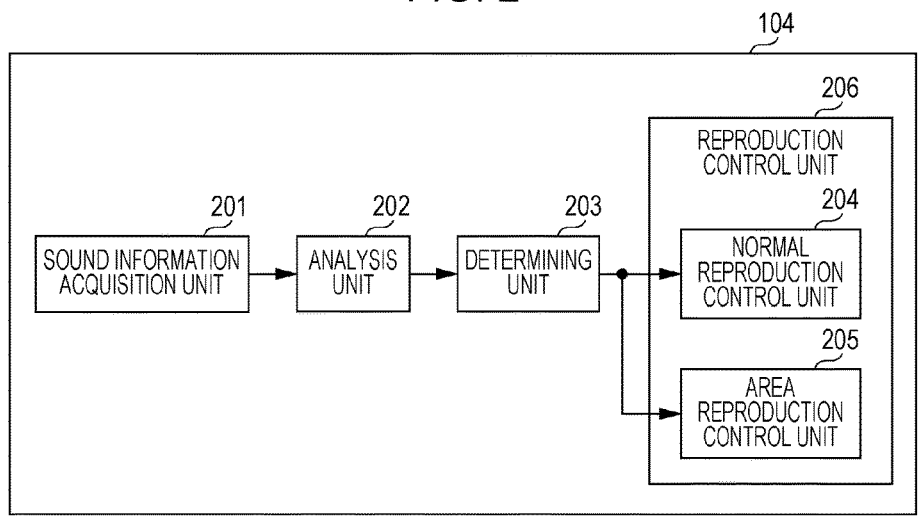
FIG. 2 is a diagram illustrating functional elements of a control unit according to the embodiment of the present disclosure.

Functional elements of the control unit 104 are described below with reference to FIG. 2. FIG. 2 is a diagram illustrating functional elements of the control unit 104 according to the embodiment of the present disclosure. Note that the functional elements of the control unit 104 illustrated in FIG. 2 are an example, and the control unit 104 may include a constituent element other than the functional elements illustrated in FIG. 2.

The control unit 104 of the speech dialogue device 100 includes a sound information acquisition unit 201, an analysis unit 202, a determining unit 203, and a reproduction control unit 206. A flow of operations and processes of these units will be described later with reference to FIG. 3.

The sound information acquisition unit 201 acquires ambient sound information indicative of sound around the speaking person. The ambient sound information includes voice spoken to the speech dialogue device.

The analysis unit 202 separates the ambient sound information acquired by the sound information acquisition unit 201 into first sound information including voice spoken to the speech dialogue device 100 and second sound information including sound other than the spoken voice.

The determining unit 203 compares the sound level of the first sound information with the sound level of the second sound information. The determining unit 203 determines whether or not the sound level of the first sound information is higher than the sound level of the second sound information.

The reproduction control unit 206 reproduces an audio response by using one of a first reproduction method and a second reproduction method that is different in terms of directivity of reproduced sound from the first reproduction method in accordance with a result of the comparison in the determining unit 203. The first reproduction method is a reproduction method having no directivity, and the second reproduction method is a reproduction method having directivity toward the speaking person. The reproduction control unit 206 includes a normal reproduction control unit 204 and an area reproduction control unit 205.

The normal reproduction control unit 204 reproduces the audio response by using the first reproduction method in a case where the determining unit 203 determines that the sound level of the first sound information is higher than the sound level of the second sound information.

The area reproduction control unit 205 reproduces the audio response by using the second reproduction method in a case where the determining unit 203 determines that the sound level of the first sound information is lower than the sound level of the second sound information.

Note that in a case where the determining unit 203 determines that the sound level of the first sound information is the same as the sound level of the second sound information, the normal reproduction control unit 204 may reproduce the audio response by using the first reproduction method or the area reproduction control unit 205 may reproduce the audio response by using the second reproduction method.

Processes of Speech Dialogue Device 100

Figure 3:
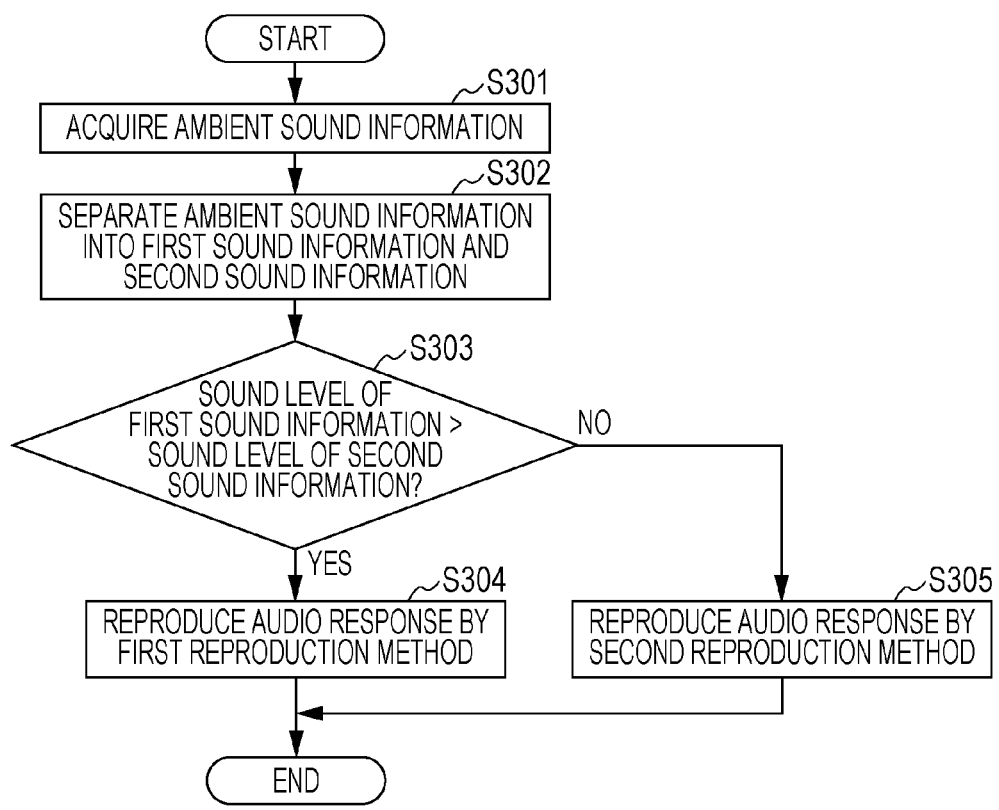
FIG. 3 is a flow chart illustrating an example of an operation of the speech dialogue device according to the present embodiment.

FIG. 3 is a flow chart illustrating an example of an operation of the speech dialogue device according to the present embodiment.

First, the sound information acquisition unit 201 acquires sound information (ambient sound information) acquired by the sound acquisition unit 101 (Step S301). The acquired sound information includes, for example, voice of a speaking person who speaks an audio command to the speech dialogue device 100 (speech dialogue system), voice of a person other than the speaking person who speaks the audio command to the speech dialogue device 100 (speech dialogue system), and noise other than the voice spoken by the persons. It is desirable that the acquired sound information be information separated on the basis of an arrival direction. In a case where the sound acquisition unit 101 is a microphone that is capable of performing directional sound pickup, the sound information acquisition unit 201 can acquire pieces of sound information in respective sound arrival directions (respective regions each having an angle). The sound information acquisition unit 201 acquires pieces of sound information in the respective sound arrival directions (the respective plurality of regions each having an angle). The sound information acquisition unit 201 supplies the acquired sound information to the analysis unit 202. That is, the sound information acquisition unit 201 may acquire a plurality of pieces of ambient sound information having directivity in respective predetermined angles that are acquired by an array microphone system including a plurality of microphones.

Next, the analysis unit 202 separates the ambient sound information acquired by the sound information acquisition unit 201 into first sound information including voice spoken to the speech dialogue device 100 and second sound information including sound other than the spoken voice (Step S302).

The analysis unit 202 analyzes (including classification or separation) the sound information acquired by the sound information acquisition unit 201. The analysis unit 202 classifies the sound information into at least voice of the speaking person who has spoken the audio command to the speech dialogue device 100 (speech dialogue system) and voice spoken by the person other than the speaking person who has spoken the audio command. The analysis unit 202 may classify the sound information into voice of the speaking person who has spoken the audio command to the speech dialogue device 100 (speech dialogue system), voice spoken by the person other than the speaking person who has spoken the audio command, and ambient noise other than the voice.

In a case where pieces of sound information in respective sound arrival directions are acquired Step S301, the analysis unit 202 classifies each of the pieces of sound information in the respective sound arrival directions into the first sound information including voice spoken to the speech dialogue system and the second sound information including sound other the spoken voice. That is, the analysis unit 202 may separate each of the acquired plurality of pieces of ambient sound information into the first sound information and the second sound information by determining whether or not each of the plurality of pieces of ambient sound information is voice spoken to the speech dialogue device 100.

Although it is desirable that pieces of sound information in respective sound arrival directions be acquired in Step S301 as described above, the analysis unit 202 may perform processing for separating acquired sound information into pieces of sound information in respective sound arrival directions. That is, the analysis unit 202 may separate acquired sound information into pieces of sound information in respective sound arrival directions (regions) and then determine whether each of the pieces of sound information in the respective sound arrival directions (regions) is the first sound information including spoken voice of the speaking person who has spoken the audio command to the speech dialogue device 100 (speech dialogue system) or the second sound information including sound other than the spoken voice.

Next, the determining unit 203 compares the sound level of the first sound information with the sound level of the second sound information and thus determines whether or not the sound level of the first sound information is higher than the sound level of the second sound information (Step S303).

The determining unit 203 compares the sound level of the voice of the speaking person who has spoken the audio command to the speech dialogue device 100 (speech dialogue system) with the sound level of the sound other than the spoken voice on the basis of a result of analysis in the analysis unit 202. The sound level indicates the intensity of sound and can also be expressed as a sound volume or a volume.

Then, in a case where it is determined as a result of comparison in the determining unit 203 that the sound level of the first sound information including the spoken voice of the speaking person who has spoken the audio command to the speech dialogue device 100 (speech dialogue system) is higher than that of the second sound information including the sound other than the spoken voice (YES in Step S303), the process proceeds to Step S304. Meanwhile, in a case where it is determined that the sound level of the first sound information including the spoken voice of the speaking person who has spoken the audio command to the speech dialogue device 100 (speech dialogue system) is lower than that of the second sound information including the sound other than the spoken voice (NO in Step S303), the process proceeds to Step S305.

In a case where it is determined that the sound level of the first sound information is higher than that of the second sound information, the normal reproduction control unit 204 controls the reproduction unit 105 to reproduce an audio response by using the first reproduction method in Step S304. Alternatively, the normal reproduction control unit 204 generate control information for controlling the reproduction unit 105 to reproduce the audio response by using the first reproduction method. The first reproduction method is a normal reproduction method. The normal reproduction method is a reproduction method for reproducing sound (audio response) having no directivity.

Meanwhile, in a case where it is determined that the sound level of the first sound information is lower than that of the second sound information, the area reproduction control unit 205 controls the reproduction unit 105 to reproduce the audio response by using the second reproduction method in Step S305. Alternatively, the area reproduction control unit 205 generates control information for controlling the reproduction unit 105 to reproduce the audio response by using the second reproduction method. The second reproduction method is a reproduction method that reproduces sound (audio response) by directional reproduction. In the second reproduction method, an audio response is reproduced toward a speaking person only. In a case where each of the pieces of sound information in the respective sound arrival directions is classified into the first sound information including the spoken voice of the speaking person who has spoken the audio command to the speech dialogue device 100 (speech dialogue system) and the second sound information including sound other than the spoken voice in Step S302, the area reproduction control unit 205 reproduces the audio response by directional reproduction (area reproduction) toward a region in which sound information classified into the first sound information has been acquired.

Note that the reproduction unit 105 may make the sound level of the audio response reproduced by using the second reproduction method larger than that of the audio response reproduced by using the first reproduction method.

Configuration of Speech Dialogue System

Figure 4:
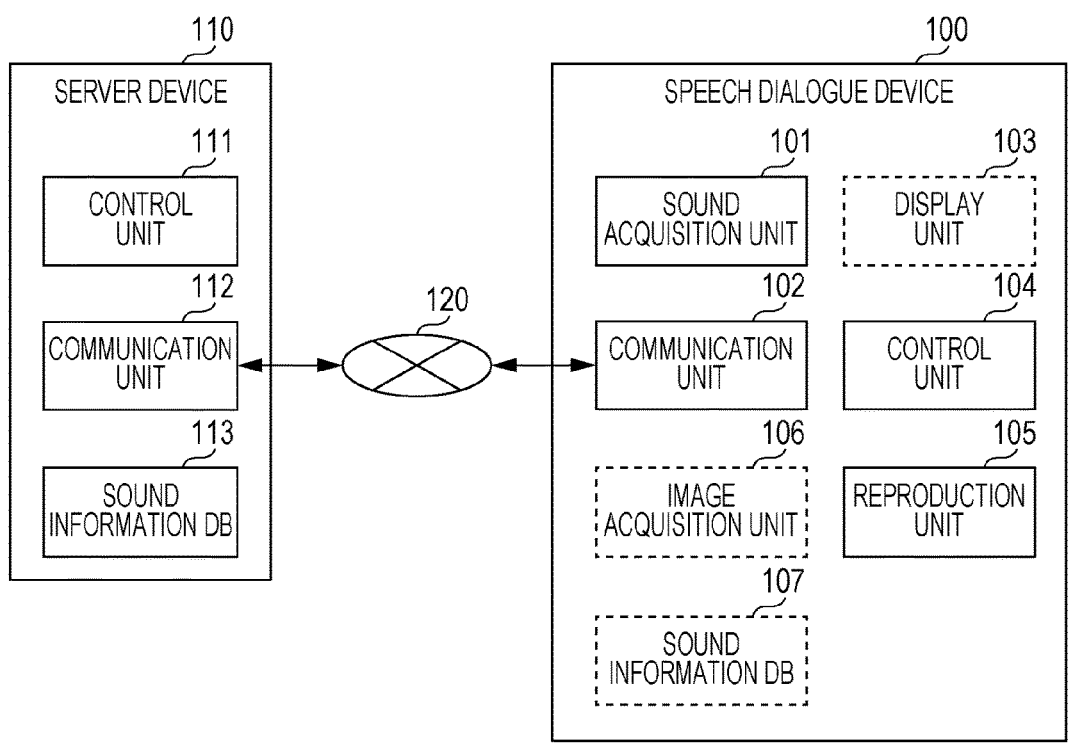
FIG. 4 is a diagram illustrating a configuration of the speech dialogue system according to the present embodiment.

Next, another example of a configuration according to the present embodiment is described with reference to FIG. 4. FIG. 4 is a diagram illustrating a configuration of the speech dialogue system according to the present embodiment. The speech dialogue system includes the speech dialogue device 100 and a server device 110.

In the example of the configuration illustrated in FIG. 4, the speech dialogue device 100 is connected to the external server device 110 over a network 120 so as to be communicable with the server device 110. A method of connection (communication) between the server device 110 and the speech dialogue device 100 is not limited in particular. The server device 110 and the speech dialogue device 100 may be connected to each other by radio or may be connected to each other by a cable. A place where the server device 110 is placed is not limited in particular. The server device 110 may be placed in a data center owned by a company that manages and runs the data center handling big data or may be placed in each household. That is, the server device 110 may be placed in the same space as a space in which the speech dialogue device 100 is placed or may be placed in a space different from the space in which the speech dialogue device 100 is placed.

In the example illustrated in FIG. 4, the speech dialogue device 100 includes the sound acquisition unit 101, the communication unit 102, the display unit 103, the control unit 104, the reproduction unit 105, the image acquisition unit 106, and the sound information DB 107. As in the example illustrated in FIG. 1, the display unit 103, the image acquisition unit 106, and the sound information DB 107 are not essential constituent elements of the speech dialogue device 100. Note, however, that in the example illustrated in FIG. 4, the communication unit 102 is an essential constituent element of the speech dialogue device 100. Furthermore, the server device 110 includes a control unit 111, a communication unit 112, and a sound information DB 113.

The functions of the constituent elements of the speech dialogue device 100 illustrated in FIG. 4 are similar to those of the constituent elements described above, and therefore description thereof is omitted. The communication unit 102 is connected to the communication unit 112 of the server device 110 over the network 120 such as the Internet. This allows the communication unit 102 to transmit sound information acquired by the speech dialogue device 100 to the server device 110. The server device 110 may be connected to a plurality of speech dialogue devices via the communication unit 112.

Basic functions of the control unit 111, the communication unit 112, and the sound information DB 113 in the server device 110 are similar to the functions of the control unit 104, the communication unit 102, and the sound information DB 107 in the speech dialogue device 100, and therefore description thereof is omitted.

In a case where the speech dialogue device 100 communicates with the server device 110 as in the example of the configuration illustrated in FIG. 4, some constituent elements can be provided in the server device 110. In other words, in a case where the speech dialogue device 100 communicates with the server device 110, the speech dialogue device 100 can leave the server device 110 to perform some processes. For example, in a case where the speech dialogue device 100 performs processes whose load is relatively low and the server device 110 performs processes whose load is relatively high, it is possible to lessen the processing load on the speech dialogue device 100 side. Furthermore, in a case where only information whose volume is relatively small is accumulated in the sound information DB 107 of the speech dialogue device 100 and information whose volume is relatively large is accumulated in the sound information DB 113 of the server device 110, it is possible to reduce memory consumption on the speech dialogue device 100 side. Furthermore, it is also possible that information acquired from another speech dialogue device (not illustrated) connected to the server device 110 be used.

Note that FIGS. 1 and 4 are merely examples of a configuration of a speech dialogue device and a configuration of a speech dialogue system. Therefore, the configuration in FIG. 1 may be employed or the configuration in FIG. 4 may be employed. Furthermore, a device other than the devices illustrated in FIGS. 1 and 4 may be employed as a speech dialogue device and a speech dialogue system.

The functional elements of the control unit 104 illustrated in FIG. 2 are common to the example of the configuration in FIG. 1 and the example of the configuration in FIG. 4. In the case of FIG. 4, it is only necessary that the control unit 104 include some of the functional elements illustrated in FIG. 2 and the control unit 111 includes the other functional elements. For example, the control unit 104 may include the sound information acquisition unit 201, the determining unit 203, and the reproduction control unit 206, and the control unit 111 may include the analysis unit 202. Alternatively, for example, the control unit 111 may include all of the sound information acquisition unit 201, the analysis unit 202, the determining unit 203, and the reproduction control unit 206.

Example of Operation of Speech Dialogue System

Figure 5:
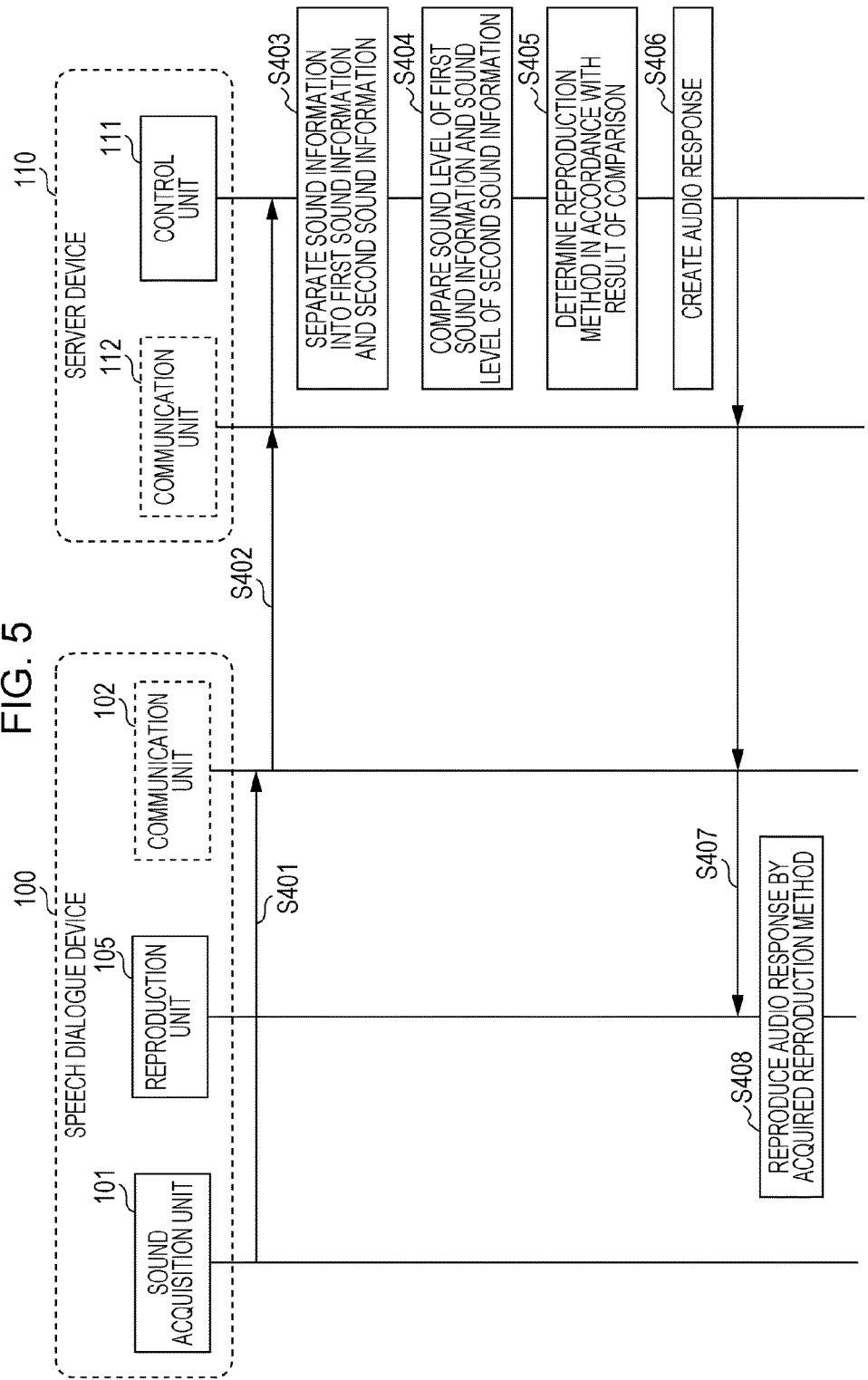
FIG. 5 is a sequence diagram for explaining an operation of the speech dialogue system according to the present embodiment.

A specific example of an operation of each device that realizes a speech dialogue system is described below with reference to FIG. 5. FIG. 5 is a sequence diagram for explaining an operation of a speech dialogue system according to the present embodiment. The following illustrates an example in which the speech dialogue system is realized by the speech dialogue device (television set) 100 and the server device 110 illustrated in FIG. 4, but the operation of the speech dialogue system illustrated in FIG. 5 is an example and does not limit the present embodiment.

First, in Step S401, the sound acquisition unit 101 of the speech dialogue device 100 supplies acquired sound information (ambient sound information) to the communication unit 102. It is desirable that the sound information acquired by the sound acquisition unit 101 be separated pieces of sound information in respective sound arrival directions. That is, the sound information supplied to the communication unit 102 by the sound acquisition unit 101 is a plurality of separated pieces of sound information in the respective sound arrival directions.

A timing at which the sound acquisition unit 101 acquires the sound information and a timing at which the sound acquisition unit 101 supplies the acquired sound information to the communication unit 102 are not limited in particular. For example, in a case where the speech dialogue device 100 is a television set, the sound acquisition unit 101 may always acquire sound information while the television set is being ON. The sound acquisition unit 101 may supply the sound information to the communication unit 102 when (immediately after) a magic word (predetermined keyword) is detected in the sound information. The magic word is a keyword for activating specific apparatus and system. For example, in a specific system, the system is activated when a magic word "microphone on" is picked up by a microphone. When an audio command for controlling an apparatus is spoken subsequently to this magic word, the microphone of the system is activated, and the specific system is controlled as instructed by the audio command given to the system.

In a case where a magic word is used to determine whether or not to acquire sound information, the sound acquisition unit 101 includes a sound recognition unit (not illustrated) and a magic word detection unit (not illustrated). The sound recognition unit converts the acquired sound information into text information. The magic word detection unit detects, in the text information obtained by conversion in the sound recognition unit, a magic word stored in advance. In a case where the magic word is detected in the text information, the magic word detection unit supplies the sound information to the communication unit 102.

Alternatively, the control unit 104 may include the sound recognition unit (not illustrated) and the magic word detection unit (not illustrated). In this case, the sound acquisition unit 101 always acquires sound information, and the control unit 104 performs a sound recognition process and a magic word detection process on the acquired sound information. This makes it possible to specify a time interval in which voice is spoken to the system. The control unit 104 may control the communication unit 102 to transmit only sound information in the specified time interval to the server device 110.

Next, in Step S402, the communication unit 102 of the speech dialogue device 100 transmits the acquired sound information to the server device 110 over the network 120. A timing at which the communication unit 102 transmits the sound information to the server device 110 is not limited in particular.

The communication unit 102 may transmit the sound information to the server device 110 every time the sound acquisition unit 101 acquires the sound information.

As described above, in a case where the sound acquisition unit 101 includes the sound recognition unit and the magic word detection unit, it is estimated that the sound information acquired by the sound acquisition unit 101 is acquired in a time interval in which voice has already been spoken to the system. Accordingly, in this case, the communication unit 102 transmits all pieces of sound information acquired by the sound acquisition unit 101 to the server device 110. Therefore, the communication unit 102 may transmit sound information at a timing at which the sound information is acquired from the sound acquisition unit 101.

Meanwhile, in a case where the control unit 104 includes the sound recognition unit and the magic word detection unit, the control unit 104 specifies a time interval in which a speaking person speaks an audio command to the system. Accordingly, the communication unit 102 transmits sound information only in the time interval specified by the control unit 104 to the server device 110. Therefore, the communication unit 102 may transmit sound information at a timing at which a time interval in which a speaking person speaks an audio command to the system is specified by the control unit 104.

The sound acquisition unit 101 may cause the acquired sound information to be stored in the sound information DB 107. In this case, the communication unit 102 may transmit sound information to the server device 110 at a timing at which a certain volume of sound information is accumulated in the sound information DB 107 or every predetermined period.

In a case where a plurality of speech dialogue devices 100 are connected to the server device 110, the communication unit 102 may transmit an ID (identification information) for specifying a speech dialogue device 100 together with sound information.

Then, the control unit 111 of the server device 110 acquires the sound information from the speech dialogue device 100 via the communication unit 112. The process in which the control unit 111 acquires the sound information corresponds to the process in Step S301 in FIG. 3.

Next, in Step S403, the control unit 111 of the server device 110 analyzes the sound information transmitted from the speech dialogue device 100. In this example, the control unit 111 separates each of the pieces of sound information in respective sound arrival directions into first sound information including spoken voice of a speaking person who has spoken an audio command to the speech dialogue device 100 (speech dialogue system) and second sound information including sound other than the spoken voice. The process in which the control unit 111 separates the sound information corresponds to the process in Step S302 in FIG. 3.

The analysis unit 202 of the control unit 111 includes at least a sound source separation unit that separates acquired sound information into pieces of sound information from respective sound sources. The sound source separation unit separates the acquired sound information into at least the first sound information including spoken voice of the speaking person who has spoken the audio command and the second sound information including sound other than the spoken voice on the basis of spectral information or features of sound power. In a case where the sound information acquired in the process in Step S402 is separated pieces of sound information in respective sound arrival directions (regions), the sound source separation unit separates each of the pieces of sound information in the respective regions. An example of sound source separation is described below.

First, for example, the sound source separation unit separates each of the acquired pieces of sound information in the respective sound arrival directions (regions) into human voice and sound other than the human voice. In a case where the sound acquisition unit 101 is directional sound pickup microphones (a plurality of microphones disposed in an array) as described above, the sound acquisition unit 101 acquires the pieces of sound information in the respective plurality of angular regions (sound arrival directions) by picking up sound while using different directional beams in the respective plurality of angular regions.

Another method for separating sound information can be, for example, a method for separating sound information on the basis of spectral information or features of general human voice. For example, a spectral subtraction method can be used as a method for detecting a voice signal only in a noise environment. The analysis unit 202 may separate ambient sound information into the first sound information and the second sound information by using the spectral subtraction method. However, a method for separating sound information into human voice and sound other than the human voice is not limited to the spectral subtraction method. The analysis unit 202 may separate acquired sound information into human voice and sound other than the human voice by grasping (accumulating), in advance, environmental sound information in a space in which the speech dialogue device 100 is placed and classifying the sound information into environmental sound information and sound information other than the environmental sound information.

Then, the analysis unit 202 separates, for each of the sound arrival directions (regions), the sound information into voice of the speaking person who has spoken to the speech dialogue system and voice of a person other than the speaking person by conducting a more detailed analysis on the separated human voice. An example of a method for separating the sound information into voice of the speaking person who has spoken to the system and voice of a person other than the speaking person is a method of detecting a magic word (predetermined keyword), acquiring features of voice of a speaking person who has spoken the magic word, specifying this speaking person as a speaking person who has spoken to the system, and then separating the voice of the speaking person from sound information having different sound features. The analysis unit 202 may determine whether or not each of the acquired plurality of pieces of ambient sound information includes a predetermined keyword that is stored in advance, and determine that ambient sound information including the predetermined keyword is spoken voice spoken to the speech dialogue system.

In a case where a person who is allowed to speak an audio command to the speech dialogue device 100 is determined in advance, a speaking person can be identified, and it is therefore possible to separate sound information into voice of the allowed person and a person other than the allowed person. For example, in a case where voice of an owner of the speech dialogue device 100 is registered in advance and is accumulated in the sound information DB 107 of the speech dialogue device 100, the analysis unit 202 can separate sound information into voice of a speaking person who has spoken to the speech dialogue system and voice of a person other than the speaking person by classifying sound information into voice that matches the accumulated voice and voice that does not match the accumulated voice.

That is, as a result of classification of the sound information by using the aforementioned method, each of the pieces of sound information in the respective sound arrival directions (regions) is classified into voice of the speaking person who has spoken the audio command to the speech dialogue device 100 (speech dialogue system), voice of a person other than the speaking person who has spoken the audio command, and ambient noise. The voice of the speaking person who has spoken the audio command to the speech dialogue device 100 (speech dialogue system) corresponds to the spoken voice of the speaking person who has spoken to the speech dialogue device 100 (speech dialogue system). Sound combining the voice of the person other than the speaking person who has spoken to the audio command and the ambient noise corresponds to the sound other than the spoken voice. It is also possible that the voice of the speaking person who has spoken the audio command to the speech dialogue device 100 (speech dialogue system) correspond to the spoken voice of the speaking person who has spoken to the speech dialogue device 100 (speech dialogue system), and the voice of the person other than the speaking person who has spoken to the audio command correspond to the sound other than the spoken voice.

In the above description, the analysis unit 202 performs, for each of the sound arrival directions (regions), sound source separation for separating the sound information into the spoken voice of the speaking person who has spoken the audio command and sound other than the spoken voice. However, sound source separation for separating the sound information for each of the sound arrival directions (regions) need not necessarily performed in Step S403. Note, however, that in a case where an audio response having directivity toward the speaking person is reproduced in Step S408 that will be described later, a direction (a position or a region) of the speaking person who has spoken to the system need be specified in advance. It is therefore desirable that sound information be analyzed for each of the sound arrival directions (regions) at the stage of separation of the sound information.

Next, in Step S404, the control unit 111 of the server device 110 compares the sound level of the first sound information including the spoken voice of the speaking person who has spoken the audio command to the speech dialogue device 100 (speech dialogue system) and the sound level of the second sound information including the sound other than the spoken voice by using a result of the analysis in Step S403.

In a case where the spoken voice of the speaking person who has spoken the audio command to the speech dialogue device 100 (speech dialogue system) corresponds to the first sound information, and sound combining the voice of the person other than the speaking person who has spoken the audio command and the ambient noise corresponds to the second sound information, the control unit 111 compares the sound level of the spoken voice of the speaking person who has spoken the audio command to the speech dialogue device 100 (speech dialogue system) with a sum of the sound level of the voice of the person other than the speaking person who has spoken the audio command and the sound level of the ambient noise.

In a case where the spoken voice of the speaking person who has spoken the audio command to the speech dialogue device 100 (speech dialogue system) corresponds to the first sound information, and the voice of the person other than the speaking person who has spoken the audio command corresponds to the second sound information, the control unit 111 compares the sound level of the spoken voice of the speaking person who has spoken the audio command to the speech dialogue device 100 (speech dialogue system) with the sound level of the voice of the person other than the speaking person who has spoken the audio command and ignores the sound level of the ambient noise.

Note that the process in Step S404 corresponds to the process in S303 in FIG. 3.

Next, in Step S405, the control unit 111 determines a reproduction method on the basis of a result of the comparison in Step S404. Specifically, in a case where the sound level of the spoken voice of the speaking person who has spoken the audio command to the speech dialogue device 100 (speech dialogue system) is higher than that of the sound other than the spoken voice, the control unit 111 determines that the first reproduction method (normal reproduction method) is used, and generates control information for controlling the reproduction unit 105 to reproduce an audio response by using the first reproduction method. The first reproduction method is a normal reproduction method. The normal reproduction method is a reproduction method for reproducing sound without directivity.

Meanwhile, in a case where the sound level of the spoken voice of the speaking person who has spoken the audio command to the speech dialogue device 100 (speech dialogue system) is lower than that of the sound other than the spoken voice, the control unit 111 determines that the second reproduction method is used, and generates control information for controlling the reproduction unit 105 to reproduce an audio response by using the second reproduction method. The second reproduction method is a directional reproduction method. Note that the process in Step S405 corresponds to the processes in S304 and S305 in FIG. 3.

Next, in Step S406, the control unit 111 creates an audio response to the audio command. First, the control unit 111 performs sound recognition. The control unit 111 performs sound recognition on only sound information in an arrival direction (region) that has been specified in Step S403 as the spoken voice of the speaking person who has spoken the audio command to the speech dialogue device 100 (speech dialogue system). Note that it is also possible that the control unit 111 do not perform sound recognition at this stage. For example, the control unit 111 may perform sound recognition in advance (e.g., after Step S403). The speech dialogue device 100 may perform sound recognition.

Then, the control unit 111 determines contents of the audio response on the basis of a result of the sound recognition. The control unit 111 may select contents of the audio response by using an external dialogue server (not illustrated). An enormous volume of dialogue response script (dialogue dictionary) is prepared in the dialogue server, and contents of the audio response can be selected by matching with the result of the sound recognition. For example, in a case where a recognition result "What will the weather be like tomorrow?" is obtained as a result of the sound recognition process, the control unit 111 determines that contents of the audio response is, for example, "It will be rainy". A method for determining contents of the audio response is not limited in particular.

Then, the control unit 111 synthesizes the audio response to be reproduced by the speech dialogue device 100 in accordance with the selected contents of the audio response. In a case where it is determined in Step S405 that the second reproduction method (directional reproduction) is used, the control unit 111 not only synthesizes the audio response, but also generates information on a directivity parameter of the reproduction unit 105 (speaker) indicative of a direction in which the audio response is to be reproduced. That is, the control unit 111 generates a directivity parameter for reproducing the audio response toward the arrival direction (region) specified by the spoken voice of the speaking person who has spoken the audio command to the speech dialogue device 100 (speech dialogue system) specified in Step S403.

In this way, the control unit 111 performs sound recognition on the separated first sound information and then generate an audio response by using a result of the sound recognition.

Next, in Step S407, the control unit 111 of the server device 110 transmits the reproduction method determined in Step S405 and the audio response created in Step S406 to the reproduction unit 105 via the communication unit 102 of the speech dialogue device 100. In a case where it is determined in Step S405 that the second reproduction method (directional reproduction) is used, the control unit 111 also transmits the information on a directivity parameter of the reproduction unit 105 (speaker) indicative of a direction in which the audio response is to be reproduced together with the reproduction method determined in Step S405 and the audio response created in Step S406. That is, the control unit 111 transmits a directivity parameter for reproducing the audio response toward the arrival direction (region) specified by the spoken voice of the speaking person who has spoken the audio command to the speech dialogue device 100 (speech dialogue system) specified in Step S403.

Next, in Step S408, the reproduction unit 105 reproduces the audio response by using the acquired reproduction method. In a case where it is determined in Step S405 that the second reproduction method (directional reproduction) is used, the reproduction unit 105 also acquires the directivity parameter of the reproduction unit 105 (speaker) indicative of a direction in which the audio response is to be reproduced, and therefore performs directional reproduction of the audio response by using the directivity parameter. The reproduction unit 105 reproduces the generated audio response by using one of the first reproduction method and the second reproduction method. In a case where the reproduction unit 105 reproduces the audio response by using the second reproduction method, the reproduction unit 105 reproduces the audio response toward an angle in which the ambient sound information specified as the spoken voice spoken to the speech dialogue system has been acquired.

Effects

As described above, according to the present embodiment, it is determined whether or not the sound level of spoken voice of a speaking person who speaks to the speech dialogue device 100 (speech dialogue system) is higher than that of sound other than the spoken voice, and an audio response is reproduced by using one of a normal reproduction method having no directivity and a reproduction method having directivity toward the speaking person on the basis of a result of the determination. This makes it possible to reproduce the audio response by using an optimum reproduction method according to a situation.

A scene in which the speech dialogue device 100 (speech dialogue system) is used is more specifically described below. The following describes a situation (hereinafter referred to as a first situation) in which a plurality of persons are present around the speech dialogue device 100 and only one person asks a question to the speech dialogue device 100.

Figure 6:
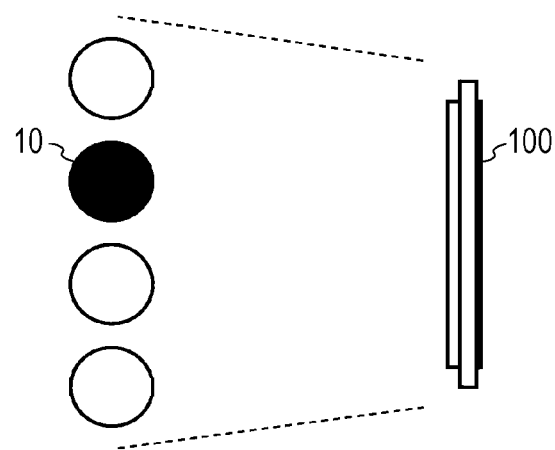
FIG. 6 is a schematic view for explaining a first reproduction method for reproducing an audio response in a case where the sound level of spoken voice of a speaking person who speaks to the speech dialogue device is higher than that of sound other than the spoken voice.

FIG. 6 is a schematic view for explaining the first reproduction method for reproducing an audio response in a case where the sound level of spoken voice of a speaking person who speaks to the speech dialogue device is higher than that of sound other than the spoken voice.

In a case where the sound level of spoken voice of a speaking person 10 who speaks to the speech dialogue device 100 is higher than that of sound other than the spoken voice, it can be assumed that persons other than the speaking person 10 who has spoken to the speech dialogue device 100 are trying not to emit sound in order to confirm a response result (audio response) from the speech dialogue device 100. That is, in this case, it is highly likely that all the persons around the speech dialogue device 100 are interested in the response result (audio response) from the speech dialogue device 100. Furthermore, since the ambient noise level is not high, it can be estimated that it is unnecessary to reproduce the audio response toward only the speaking person 10 who has spoken to the speech dialogue device 100 by giving the audio response directivity. According to the present embodiment, in a case where the sound level of the spoken voice of the speaking person 10 who speaks to the speech dialogue device 100 is higher than that of sound other than the spoken voice, an audio response can be automatically reproduced by using the first reproduction method (normal reproduction method) having no directivity (FIG. 6).

Figure 7:
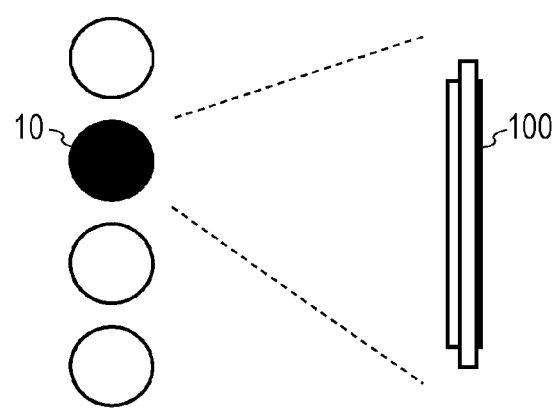
FIG. 7 is a schematic view for explaining a second reproduction method for reproducing an audio response in a case where the sound level of spoken voice of a speaking person who speaks to the speech dialogue device is lower than that of sound other than the spoken voice.

FIG. 7 is a schematic view for explaining the second reproduction method for reproducing an audio response in a case where the sound level of spoken voice of a speaking person who speaks to the speech dialogue device is lower than that of sound other than the spoken voice.

In a case where the sound level of spoken voice of the speaking person 10 who speaks to the speech dialogue device 100 is lower than that of sound other than the spoken voice, it can be assumed that persons other than (around) the speaking person 10 who has spoken to the speech dialogue device 100 are emitting sound (speaking to or conversing with not the speech dialogue device 100 but a person). That is, in this case, it is highly likely that the persons other than the speaking person 10 who has spoken to the speech dialogue device 100 are not interested in the response result (audio response) from the speech dialogue device 100. Furthermore, since the ambient noise level is high, it can be estimated that it is necessary to reproduce the audio response toward only the speaking person 10 who has spoken to the speech dialogue device 100 by giving the audio response directivity. According to the present embodiment, in a case where the sound level of the spoken voice of the speaking person 10 who speaks to the speech dialogue device 100 is lower than that of sound other than the spoken voice, the audio response can be automatically reproduced by using the second reproduction method having directivity toward the speaking person 10 (FIG. 7).

As described above, according to the present embodiment, an audio response to spoken voice can be reproduced by using an optimum reproduction method according to a situation. In general, area reproduction for reproducing sound toward only a predetermined region increases the amount of computation of the speech dialogue device 100 (speech dialogue system), but according to the present embodiment, it is possible to reduce processing load on the speech dialogue device 100 (speech dialogue system) as compared with a case where area reproduction is always performed.

Modifications of the present embodiment are described below.

Modification 1

In the present embodiment, as described above, in a case where the sound level of voice spoken to the speech dialogue device 100 (speech dialogue system) is higher than that of sound other than the spoken voice, an audio response is reproduced by using a normal reproduction method (the first reproduction method having no directivity), whereas in a case where the sound level of voice spoken to the speech dialogue device 100 (speech dialogue system) is lower than that of sound other than the spoken voice, an audio response is reproduced by using an area reproduction method (the second reproduction method having directivity toward a speaking person) (hereinafter referred to as a first reproduction control pattern). However, the present disclosure is not limited to this. For example, an audio response may be reproduced by using a reproduction method different from the above example according to a situation.

Specifically, it is also possible to employ an arrangement in which, in a situation other than the first situation described above, in a case where the sound level of voice spoken to the speech dialogue device 100 (speech dialogue system) is higher than that of sound other than the spoken voice, an audio response is reproduced by using an area reproduction method (the second reproduction method having directivity toward a speaking person), whereas in a case where the sound level of voice spoken to the speech dialogue device 100 (speech dialogue system) is lower than that of sound other than the spoken voice, an audio response is reproduced by using a normal reproduction method (the first reproduction method having no directivity) (hereinafter referred to as a second reproduction control pattern). The situation other than the first situation is, for example, a situation (hereinafter also referred to as a second situation) in which a person (e.g., an infant) other than a person who speaks to the speech dialogue device 100 (speech dialogue system) is sleeping around the speech dialogue device 100 (speech dialogue system). In a case where the sound level of voice spoken to the speech dialogue device 100 (speech dialogue system) is higher than that of sound other than the spoken voice, a person (e.g., an infant) other than a person who speaks to the speech dialogue device 100 (speech dialogue system) is making no sound, and it is therefore likely that the person other than the speaking person is, for example, sleeping.

Accordingly, in the second situation, it is preferable that in a case where the sound level of voice spoken to the speech dialogue device 100 (speech dialogue system) is higher than that of sound other than the spoken voice, an audio response is reproduced by using the second reproduction method having directivity toward a speaking person, whereas in a case where the sound level of voice spoken to the speech dialogue device 100 (speech dialogue system) is lower than that of sound other than the spoken voice, an audio response is reproduced by using the first reproduction method having no directivity. The speech dialogue device 100 (speech dialogue system) may accept user's selection of a current situation when changing reproduction control according to a situation.

Note that it may be determined whether or not a person other than a speaking person who speaks to the speech dialogue device 100 (speech dialogue system) is an infant by detecting the presence or absence of an infant by using image recognition based on an image acquired by the image acquisition unit 106.

Modification 2

A control unit 104 may include a situation estimation unit (not illustrated) that estimates a current situation from environmental sound acquired by an analysis unit 202. The situation estimation unit may be, for example, a speaking person identification unit that identifies a speaking person from sound information. This makes it possible to determine what kind of person is around the system in accordance with acquired noise. For example, in a case where it is determined as a result of the speaking person identification that an infant is present around a speech dialogue device 100 (speech dialogue system) as in the second situation, reproduction may be controlled by using the second reproduction control pattern.

That is, the speaking person identification unit may identify a person who is present around the speech dialogue device 100 (speech dialogue system) from acquired ambient sound information. The determining unit 203 may select which of the first reproduction method and the second reproduction method is used to reproduce an audio response on the basis of a result of comparison between the sound level of the first sound information and the sound level of the second sound information and a result of the identification of the person who is present around the speech dialogue device 100 (speech dialogue system).

For example, in a case where it is determined, as a result of the identification of the person who is present around the speech dialogue device 100 (speech dialogue system), that an infant is present around the speech dialogue device 100 (speech dialogue system), the determining unit 203 may determine that the second reproduction method having directivity toward a speaking person is used in a case where it is determined that the sound level of voice spoken to the speech dialogue device 100 (speech dialogue system) is higher than that of sound other than the spoken voice, whereas the determining unit 203 may determine that the first reproduction method having no directivity is used in a case where it is determined that the sound level of voice spoken to the speech dialogue device 100 (speech dialogue system) is lower than that of sound other than the spoken voice.

Note that the speaking person identification unit may identify a person who is present around the speech dialogue device 100 (speech dialogue system) from an image acquired by the image acquisition unit 106.

Modification 3

In a case where a past sound acquisition situation is accumulated in a sound information DB 107, a determining unit 203 may determine a reproduction method by using not only acquired sound information, but also the sound acquisition situation accumulated in the sound information DB 107. Specifically, at least sound information acquired previously and a reproduction method determined at the time of acquisition of the sound information are associated as a table in the sound information DB 107. With the arrangement, in a case where acquired sound information (first sound information) is similar to the sound information accumulated in the sound information DB 107, the determining unit 203 need just determine that a reproduction method same as the reproduction method determined previously is used without performing the comparison process in Step S303.

That is, the determining unit 203 may select a reproduction method used to reproduce an audio response by using the table in which first sound information acquired previously and one of the first reproduction method and the second reproduction method selected to reproduce the first sound information acquired previously are stored in association with each other.

A reproduction method may be determined by using both the comparison process in Step S303 and the table information accumulated in the sound information DB 107 in which sound information acquired previously and a reproduction method are associated with each other. Alternatively, the determining unit 203 may determine a reproduction method by using the sound information DB 107 in a case where it is determined, as a result of the comparison process in Step S303, that a difference between the sound level of the voice spoken to the speech dialogue device 100 (speech dialogue system) and the sound level of the sound other than the spoken voice is less than a predetermined value.

Modification 4

In Modification 4 of the present embodiment, information for identifying a speaking person and one the first reproduction method and the second reproduction method are stored in association with each other in a sound information database. Acquired ambient sound information is separated into the first sound information and the second sound information, and a speaking person is identified. In a case where a reproduction method associated with the identified speaking person is stored in the sound information database, an audio response is reproduced by using the reproduction method stored in the sound information database.

Also in a case where an analysis unit 202 includes a situation estimation unit (especially a speaking person identification unit) and where characteristics of voice of one or more speaking persons who use a speech dialogue device 100 (speech dialogue system) and a reproduction method are stored in advance in association with each other in the sound information DB 107, a reproduction method can be determined without performing the comparison process in Step S303. For example, in a case where a father has spoken to the speech dialogue device 100 (speech dialogue system), it is therefore possible to reproduce, in any situation, an audio response by using the second reproduction method having directivity toward the father who is the speaking person. That is, an audio response can be reproduced by using an optimum reproduction method according to individual's preference.

A speech dialogue device 100 according to Modification 4 of the present embodiment is described below.

A configuration of the speech dialogue device 100 according to Modification 4 of the present embodiment is described with reference to FIGS. 1 and 2.

An analysis unit 202 includes a speaking person identification unit (not illustrated). The speaking person identification unit identifies a speaking person who has spoken voice.

A sound information DB 107 stores therein information for identifying a speaking person and one of the first reproduction method and the second reproduction method in association with each other. The information for identifying a speaking person is, for example, the name of the speaking person, the nickname of the speaking person, or an ID number of the speaking person. The information for identifying a speaking person may be sound information indicative of voice spoken by the speaking person or may be features of sound information indicative of voice spoken by the speaking person.

The speech dialogue device 100 may accept user's input of information for identifying a speaking person and a reproduction method in advance. The sound information DB 107 may store therein the information for identifying a speaking person and one of the first reproduction method and the second reproduction method that have been entered by the user in advance in association with each other.

A reproduction control unit 206 selects one of the first reproduction method and the second reproduction method that is associated with the identified speaking person in the sound information DB 107. The reproduction control unit 206 controls a reproduction unit 105 to reproduce an audio response by using the selected one of the first reproduction method and the second reproduction method.

Figure 8:
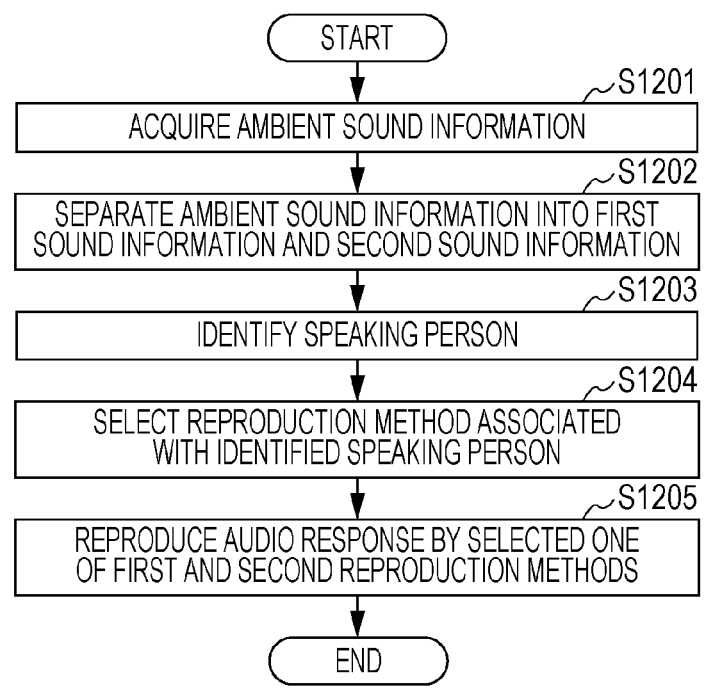
FIG. 8 is a flow chart illustrating an example of an operation of a speech dialogue device according to Modification 4 of the present embodiment.

FIG. 8 is a flow chart illustrating an example of an operation of the speech dialogue device according to Modification 4 of the present embodiment.

The processes in Step S1201 and Step S1202 are identical to those in Step S301 and Step S302 illustrated in FIG. 3, and therefore description thereof is omitted.

Next, in Step S1203, the speaking person identification unit identifies a speaking person who has spoken voice.

Next, in Step S1204, the reproduction control unit 206 selects one of the first reproduction method and the second reproduction method that is associated with the identified speaking person in the sound information DB 107.

Next, in Step S1205, the reproduction control unit 206 controls the reproduction unit 105 to reproduce an audio response by using the selected one of the first reproduction method and the second reproduction method. That is, in a case where the identified speaking person is associated with the first reproduction method, a normal reproduction control unit 204 controls the reproduction unit 105 to reproduce the audio response by using the first reproduction method having no directivity. In a case where the second reproduction method is associated with the identified speaking person, an area reproduction control unit 205 controls the reproduction unit 105 to reproduce the audio response by using the second reproduction method having directivity toward only the speaking person.

In Modification 4, information for identifying a speaking person and one of the first reproduction method and the second reproduction method are stored in advance in association with each other in the sound information DB 107. However, information for identifying a speaking person and one of the first reproduction method and the second reproduction method are not necessarily stored in association with each other in the sound information DB 107. Accordingly, after the process in Step S1203, the determining unit 203 may determine whether or not a reproduction method is associated with the identified speaking person by referring to the sound information DB 107. In a case where a reproduction method is associated with the identified speaking person, the reproduction control unit 206 selects one of the first reproduction method and the second reproduction method that is associated with the identified speaking person in the sound information DB 107.

Meanwhile, in a case where no reproduction method is associated with the identified speaking person, the determining unit 203 may determine whether or not the sound level of the first sound information is higher than that of the second sound information. Then, in a case where it is determined that the sound level of the first sound information is higher than that of the second sound information, the normal reproduction control unit 204 controls the reproduction unit 105 to reproduce the audio response by using the first reproduction method. In a case where it is determined that the sound level of the first sound information is lower than that of the second sound information, the area reproduction control unit 205 controls the reproduction unit 105 to reproduce the audio response by using the second reproduction method. Then, the reproduction control unit 206 may cause information for identifying the speaking person and one of the first reproduction method and the second reproduction method that has been used to reproduce the audio response to be stored in association with each other in the sound information DB 107.

In the comparison process in Step S303, the determining unit 203 may determine whether or not the sound level of voice spoken to the speech dialogue device 100 (speech dialogue system) is higher than that of sound other than the spoken voice only in a case where an absolute value of a difference between the sound level of the voice spoken to the speech dialogue device 100 (speech dialogue system) and the sound level of the sound other than the spoken voice is equal to or higher than a predetermined threshold value. In a case where the absolute value of the difference is smaller than the predetermined threshold value, the determining unit 203 may determine that the audio response is to be reproduced by using a reproduction method corresponding to a user identified by the speaking person identification unit among reproduction methods for respective users stored as initial settings in the sound information DB 107. This makes it possible to prevent a reproduction method from frequently changing.

Modification 5

A determining unit 203 may determine a reproduction method by using image information acquired by an image acquisition unit 106. For example, an analysis unit 202 may include an image recognition unit (not illustrated), and the image recognition unit may recognize the number of persons who are interested in a speech dialogue device 100 (speech dialogue system). This allows the determining unit 203 to determine a reproduction method on the basis of a result of recognition obtained by the image recognition unit without performing the comparison process in Step S303.

For example, in a case where the number of persons who are interested in the speech dialogue device 100 (speech dialogue system) is equal to or larger than a threshold value, the determining unit 203 may determine that a normal reproduction method (first reproduction method) is used as the reproduction method. In a case where the number of persons who are interested in the speech dialogue device 100 (speech dialogue system) is lower than the threshold value, the determining unit 203 may determine that an area reproduction method (second reproduction method) is used as the reproduction method. A method for recognizing whether or not a person is interested in the speech dialogue device 100 (speech dialogue system) on the basis of an acquired image can be a method using a result of an existing face recognition process or visual line recognition process. For example, in a case where it is determined as a result of the face recognition process that a person is facing the speech dialogue device 100 (speech dialogue system), the determining unit 203 may determine that the person is interested in the speech dialogue device 100 (speech dialogue system). For example, in a case where it is determined as a result of the visual line recognition process that a person is looking toward the speech dialogue device 100 (speech dialogue system), the determining unit 203 may determine that the person is interested in the speech dialogue device 100 (speech dialogue system).

The determining unit 203 may determine a reproduction method by using a result obtained by the image recognition unit after the comparison process in Step S303. Use of both of a result of comparison of sound levels and a result of image processing makes it possible to estimate a situation more accurately, thereby making it possible to select an appropriate reproduction method. For example, in a case where the sound level of voice spoken to the speech dialogue device 100 (speech dialogue system) is lower than the sound level of sound other than the spoken voice, the determining unit 203 may acquire the position of a person who is interested in the speech dialogue device 100 (speech dialogue system) by using an acquired image and then reproduce an audio response by using a reproduction method having directivity toward the position of the person who is interested in the speech dialogue device 100 (speech dialogue system).

In this case, the image acquisition unit 106 acquires an image around the speech dialogue device 100. The analysis unit 202 detects a person who is paying attention to the speech dialogue device 100 (speech dialogue system) on the basis of the acquired image. The area reproduction control unit 205 controls the reproduction unit 105 to reproduce the audio response toward the detected person when reproducing the audio response by using the second reproduction method. The reproduction unit 105 reproduces the audio response toward the detected person when reproducing the audio response by using the second reproduction method.

Modification 6

A sound acquisition unit 101 may be provided not in a speech dialogue device 100 but in a sound pickup device different from the speech dialogue device 100. For example, in a case where the speech dialogue device 100 is a television set, a remote control for remotely controlling the television set may include the sound acquisition unit 101. The reproduction control method according to the present embodiment is realized by establishing communication between the speech dialogue device 100 (or the server device 110) and the sound pickup device (remote control) by using a predetermined method.

Note that the speech dialogue device 100 may include a detection unit that detects the position of the sound pickup device (remote control). This makes detection of a sound arrival direction in Step S403 unnecessary. That is, in area reproduction toward a sound arrival direction in Step S305, the reproduction unit 105 need just reproduce an audio response toward the position of the remote control. In this case, the determining unit 203 may determine a reproduction method on the basis of whether or not a speaking person who speaks to the speech dialogue device 100 (speech dialogue system) has spoken while pressing a button (a physical button or a virtual button displayed on a touch panel) of the sound pickup device (remote control). For example, the determining unit 203 may perform area reproduction in Step S305 only in a case where the speaking person has spoken while pressing the button. This makes the comparison process in Step S303 unnecessary and makes it possible to reproduce an audio response by using a reproduction method reflecting user's intention more.

A speech dialogue system according to Modification 6 of the present embodiment is described below. The speech dialogue system includes the sound pickup device and the speech dialogue device 100.

The sound pickup device is held by a speaking person and includes the sound acquisition unit 101. The sound acquisition unit 101 picks up voice spoken to the speech dialogue system. The sound pickup device transmits sound information indicative of the spoken voice thus picked up to the speech dialogue device 100. The sound pickup device includes a button and transmits, together with the sound information, button pressing information (predetermined instruction signal) indicative of whether or not the spoken voice has been picked up while the button is being pressed.

An image acquisition unit 106 acquires an image around the speech dialogue device 100. An analysis unit 202 includes an image recognition unit (not illustrated). The image recognition unit specifies the position of a speaking person who has spoken to the sound pickup device on the basis of the acquired image.

The determining unit 203 determines whether or not the spoken voice has been picked up while the predetermined instruction signal is being input to the sound pickup device by the speaking person.

In a case where it is determined that the spoken voice has not been picked up while the predetermined instruction signal is being input to the sound pickup device, a normal reproduction control unit 204 controls a reproduction unit 105 to reproduce an audio response by using the first reproduction method.

In a case where it is determined that the spoken voice has been picked up while the predetermined instruction signal is being input to the sound pickup device, an area reproduction control unit 205 controls the reproduction unit 105 to reproduce the audio response by using the second reproduction method.

Figure 9:
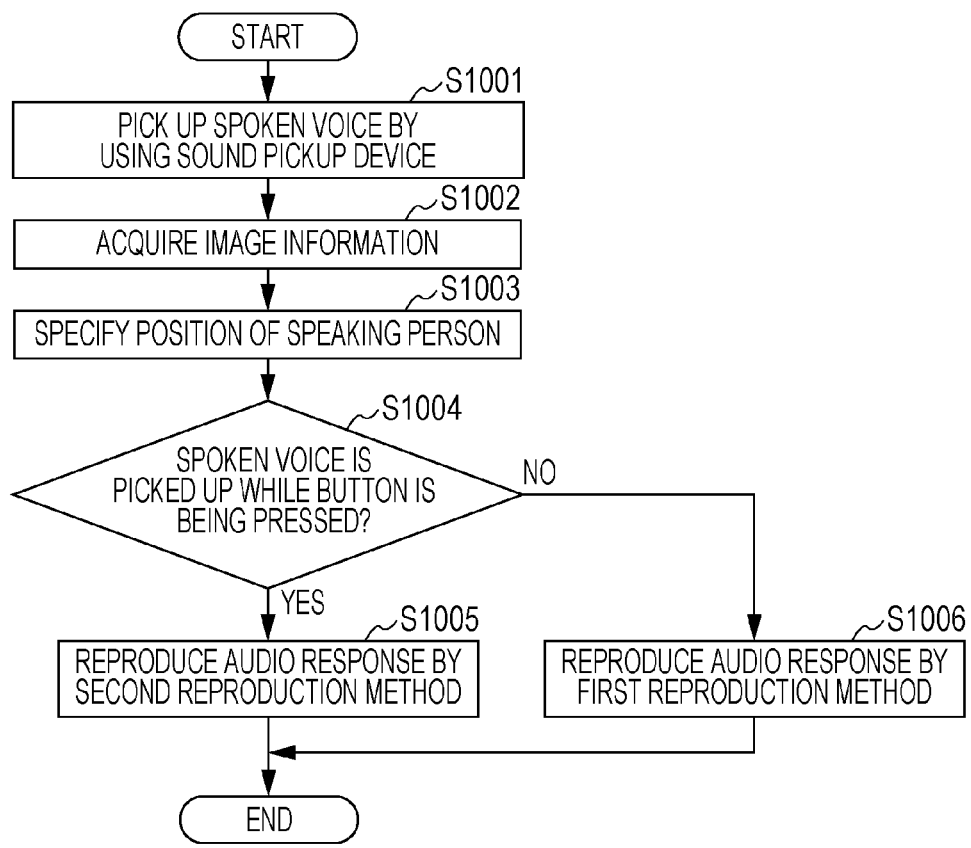
FIG. 9 is a flow chart illustrating an example of an operation of a speech dialogue system according to Modification 6 of the present embodiment.

FIG. 9 is a flow chart illustrating an example of an operation of the speech dialogue system according to Modification 6 of the present embodiment.

First, in Step S1001, the sound acquisition unit 101 of the sound pickup device picks up voice spoken to the speech dialogue system. The sound pickup device transmits sound information indicative of the spoken voice thus picked up to the speech dialogue device 100. A communication unit 102 of the speech dialogue device 100 receives the sound information transmitted by the sound pickup device.

Next, in Step S1002, the image acquisition unit 106 acquires an image around the speech dialogue device 100.

Next, in Step S1003, the image recognition unit specifies the position of a speaking person who has spoken to the sound pickup device on the basis of the acquired image. For example, the image recognition unit may detect the sound pickup device by image recognition and then specify the detected position of the sound pickup device as the position of the speaking person.

Next, in Step S1004, the determining unit 203 determines whether or not the spoken voice has been picked up while the button of the sound pickup device is being pressed by the speaking person. As described above, button pressing information indicative of whether or not the spoken voice has been picked up while the button is being pressed is transmitted together with the sound information. Accordingly, the determining unit 203 determines that the spoken voice has been picked up while the button is being pressed in a case where the button pressing information transmitted together with the sound information indicates that the spoken voice has been picked up while the button is being pressed, whereas the determining unit 203 determines that the spoken voice has been picked up while the button is not being pressed in a case where the button pressing information transmitted together with the sound information indicates that the spoken voice has been picked up while the button is not being pressed.

In a case where it is determined that the spoken voice has been picked up while the button is being pressed (YES in Step S1004), the area reproduction control unit 205 controls the reproduction unit 105 to reproduce an audio response by using the second reproduction method in Step S1005.

Meanwhile, in a case where it is determined that the spoken voice has not been picked up while the button is being pressed, i.e., in a case where it is determined that the spoken voice has been picked up while the button is not being pressed (NO in Step S1004), the normal reproduction control unit 204 controls the reproduction unit 105 to reproduce the audio response by using the first reproduction method in Step S1006.

The sound pickup device is not limited to the remote control and can be, for example, a microphone exclusively for the speech dialogue system, a mobile terminal (a smartphone, a tablet-type computer, or the like) owned by a user using the speech dialogue system, a wearable terminal (a human body wearable terminal, a smart watch, a smart band, or the like), a sound pickup microphone mounted on a ceiling or a wall of a room, or the like. In a case where the sound pickup device is a mobile terminal (a smartphone, a tablet-type computer, or the like) owned by a user using the speech dialogue system, it is possible to acquire spoken voice of the user on a routine basis because the mobile terminal has a function of acquiring spoken voice of the user. In this case, the sound information DB 107 described in Modification 4 can be easily constructed. In this case, the sound information DB 107 may be provided not in the sound pickup device but in the speech dialogue device 100 or the server device 110.

Modification 7

In Modification 7 of the present embodiment, in a case where a plurality of persons are paying attention to a speech dialogue device 100 (speech dialogue system), an audio response is reproduced by using the first reproduction method having no directivity, whereas in a case where a plurality of persons are not paying attention to the speech dialogue device 100 (speech dialogue system), i.e., in a case where only a speaking person is paying attention to the speech dialogue device 100 (speech dialogue system), the audio response is reproduced by using the second reproduction method having directivity toward only the speaking person.

A configuration of the speech dialogue device 100 according to Modification 7 of the present embodiment is described with reference to FIGS. 1 and 2.

An image acquisition unit 106 acquires an image around the speech dialogue device 100.

An analysis unit 202 includes an image recognition unit (not illustrated). The image recognition unit detects the number of persons who are paying attention to the speech dialogue device 100 by detecting directions of faces and eyes of persons around the speech dialogue device 100 on the basis of the acquired image.

A determining unit 203 determines whether or not a plurality of persons are paying attention to the speech dialogue device 100.

In a case where the determining unit 203 determines that a plurality of persons are paying attention to the speech dialogue device 100, a normal reproduction control unit 204 controls a reproduction unit 105 to reproduce an audio response by using the first reproduction method having no directivity.

In a case where the determining unit 203 determines that a plurality of persons are not paying attention to the speech dialogue device 100, an area reproduction control unit 205 controls the reproduction unit 105 to reproduce the audio response by using the second reproduction method having directivity toward only a speaking person.

Figure 10:
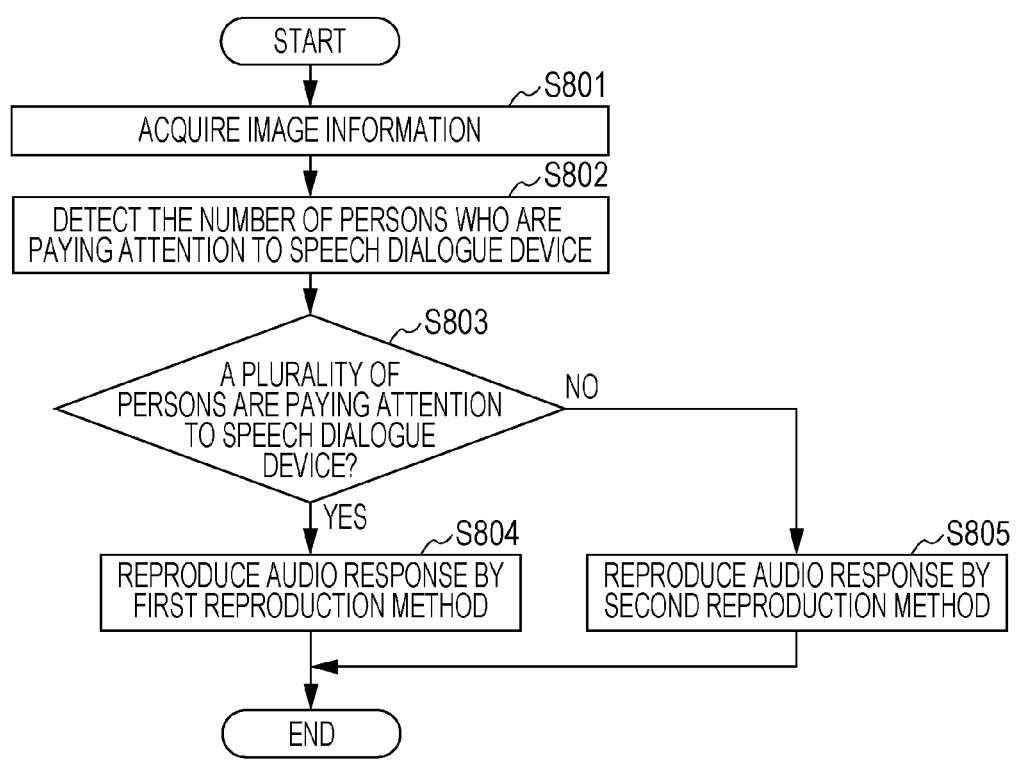
FIG. 10 is a flow chart illustrating an example of an operation of a speech dialogue device according to Modification 7 of the present embodiment.

FIG. 10 is a flow chart illustrating an example of an operation of the speech dialogue device according to Modification 7 of the present embodiment.

First, in Step S801, the image acquisition unit 106 acquires an image around the speech dialogue device 100.

Next, in Step S802, the image recognition unit detects the number of persons who are paying attention to the speech dialogue device 100 by detecting directions of faces and eyes of persons around the speech dialogue device 100 on the basis of the image acquired by the image acquisition unit 106. In a case where a face or eyes of a person are directed toward the speech dialogue device 100 (image acquisition unit 106), the image recognition unit determines that the person is paying attention to the speech dialogue device 100. Note that the image recognition unit may detect one of a direction of a face and a direction of eyes.

Next, in Step S803, the determining unit 203 determines whether or not a plurality of persons are paying attention to the speech dialogue device 100. In a case where it is determined that a plurality of persons are paying attention to the speech dialogue device 100 (YES in Step S803), the normal reproduction control unit 204 controls the reproduction unit 105 to reproduce an audio response by using the first reproduction method in Step S804.

Meanwhile, in a case where a plurality of persons are not paying attention to the speech dialogue device 100 (NO in Step S803), the area reproduction control unit 205 controls the reproduction unit 105 to reproduce the audio response by using the second reproduction method in Step S805.

In Modification 7 of the present embodiment, a process of comparing the sound level of voice spoken to the speech dialogue device 100 (speech dialogue system) with the sound level of sound other than the spoken voice need not be performed.

In Modification 7 of the present embodiment, since an audio response need be created, the speech dialogue device 100 (server device 110) performs a process of acquiring ambient sound information (Step S301 in FIG. 3), a process of separating the ambient sound information into first sound information and second sound information (Step S302 in FIG. 3), and a process of creating an audio response (Step S406 in FIG. 5).

Modification 8

In Modification 8 of the present embodiment, the number of persons around a speech dialogue device 100 (speech dialogue system) is detected on the basis of ambient sound information. In a case where a plurality of persons are around the speech dialogue device 100 (speech dialogue system) and where a plurality of persons are paying attention to the speech dialogue device 100 (speech dialogue system), an audio response is reproduced by using the first reproduction method having no directivity. In a case where a plurality of persons are not around the speech dialogue device 100 (speech dialogue system), i.e., in a case where only a speaking person is around the speech dialogue device 100 (speech dialogue system), the audio response is reproduced by using the second reproduction method having directivity toward only the speaking person. In a case where a plurality of persons are not paying attention to the speech dialogue device 100 (speech dialogue system), i.e., in a case where only a speaking person is paying attention to the speech dialogue device 100 (speech dialogue system), the audio response is reproduced by using the second reproduction method having directivity only toward the speaking person.

An image acquisition unit 106 acquires an image around the speech dialogue device 100.

An analysis unit 202 includes an image recognition unit (not illustrated). The image recognition unit detects the number of persons who are paying attention to the speech dialogue device 100 by detecting directions of faces and eyes of persons around the speech dialogue device 100 on the basis of the acquired image.

The analysis unit 202 detects the number of persons who are speaking around the speech dialogue device 100 on the basis of ambient sound information acquired by a sound information acquisition unit 201. The analysis unit 202 extracts sound information indicative of voice spoken by a person from the ambient sound information and then detects the number of persons who are speaking on the basis of differences in features among the extracted pieces of sound information.

A determining unit 203 determines whether or not a plurality of persons are around the speech dialogue device 100. In a case where the number of speaking persons detected by the analysis unit 202 is two or more, the determining unit 203 determines that a plurality of persons are around the speech dialogue device 100, whereas in a case where the number of speaking persons detected by the analysis unit 202 is one, the determining unit 203 determines that a plurality of persons are not around the speech dialogue device 100.

In a case where it is determined that a plurality of persons are around the speech dialogue device 100, the determining unit 203 determines whether or not a plurality of persons are paying attention to the speech dialogue device 100.

In a case where the determining unit 203 determines that a plurality of persons are paying attention to the speech dialogue device 100, a normal reproduction control unit 204 controls a reproduction unit 105 to reproduce an audio response by using the first reproduction method having no directivity.

In a case where the determining unit 203 determines that a plurality of persons are not around the speech dialogue device 100, an area reproduction control unit 205 controls the reproduction unit 105 to reproduce the audio response by using the second reproduction method having directivity toward only a speaking person. In a case where the determining unit 203 determines that a plurality of persons are not paying attention to the speech dialogue device 100, the area reproduction control unit 205 controls the reproduction unit 105 to reproduce the audio response by using the second reproduction method having directivity toward only a speaking person.

Figure 11:
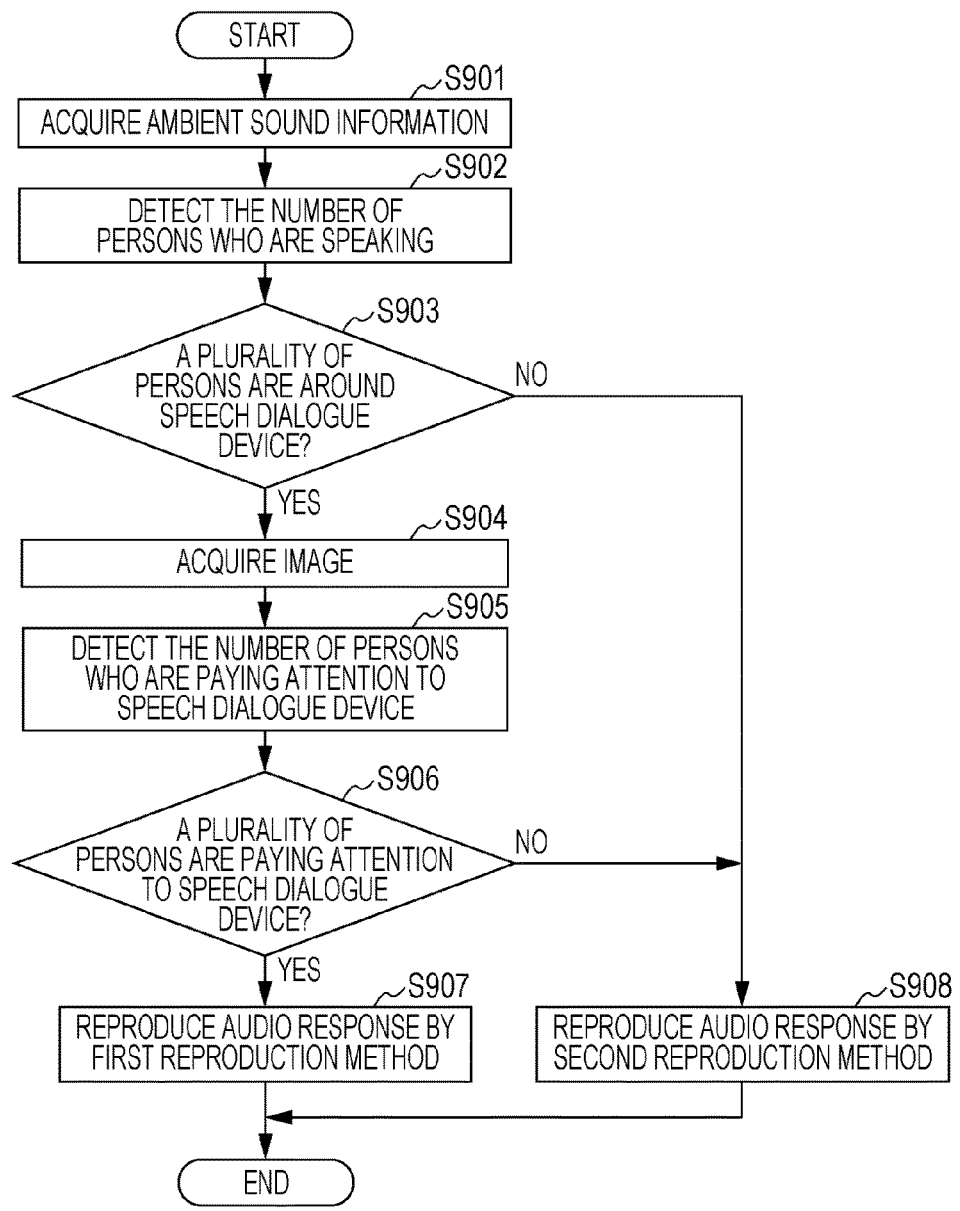
FIG. 11 is a flow chart illustrating an example of an operation of a speech dialogue device according to Modification 8 of the present embodiment.

FIG. 11 is a flow chart illustrating an example of an operation of the speech dialogue device according to Modification 8 of the present embodiment.

First, in Step S901, the sound information acquisition unit 201 acquires sound information (ambient sound information) acquired by the sound acquisition unit 101. Note that the process in Step S901 is identical to the process in Step S301 illustrated in FIG. 3.

Next, in Step 902, the analysis unit 202 detects the number of persons who are speaking around the speech dialogue device 100 on the basis of the ambient sound information acquired by the sound information acquisition unit 201.

Next, in Step S903, the determining unit 203 determines whether or not a plurality of persons are around the speech dialogue device 100. In a case where it is determined that a plurality of persons are around the speech dialogue device 100 (YES in Step S903), the image acquisition unit 106 acquires an image around the speech dialogue device 100 in Step S904.

Next, in Step S905, the image recognition unit detects the number of persons who are paying attention to the speech dialogue device 100 by detecting directions of faces and eyes of persons around the speech dialogue device 100 on the basis of the image acquired by the image acquisition unit 106. In a case where a face or eyes of a person is directed toward the speech dialogue device 100 (image acquisition unit 106), the image recognition unit determines that the person is paying attention to the speech dialogue device 100. Note that the image recognition unit may detect one of a direction of a face and a direction of eyes.

Next, in Step S906, the determining unit 203 determines whether or not a plurality of persons are paying attention to the speech dialogue device 100. In a case where it is determined that a plurality of persons are paying attention to the speech dialogue device 100 (YES in Step S906), the normal reproduction control unit 204 controls the reproduction unit 105 to reproduce an audio response by using the first reproduction method in Step S907.

Meanwhile, in a case where it is determined that a plurality of persons are not around the speech dialogue device 100 (NO in Step S903) or in a case where it is determined that a plurality of persons are not paying attention to the speech dialogue device 100 (NO in Step S906), the area reproduction control unit 205 controls the reproduction unit 105 to reproduce the audio response by using the second reproduction method in Step S908.

In Modification 8 of the present embodiment, a process of comparing the sound level of voice spoken to the speech dialogue device 100 (speech dialogue system) with the sound level of sound other than the spoken voice need not be performed.

In Modification 8 of the present embodiment, since an audio response need be created, the speech dialogue device 100 (server device 110) performs a process of separating the ambient sound information into first sound information and second sound information (Step S302 in FIG. 3) and a process of creating an audio response (Step S406 in FIG. 5).

Modification 9

In Modification 9 of the present embodiment, the position of a speaking person and one of the first reproduction method and the second reproduction method are stored in advance in association with each other in a sound information database. Acquired ambient sound information is separated into first sound information and second sound information, and then the position of a speaking person is specified. In a case where a reproduction method associated with the specified position of the speaking person is stored in the sound information database, an audio response is reproduced by using the reproduction method stored in the sound information database.

A configuration of a speech dialogue device 100 according to Modification 9 of the present embodiment is described with reference to FIGS. 1 and 2.

A sound information acquisition unit 201 acquires a plurality of pieces of ambient sound information having directivity in respective predetermined angles. Note that a sound acquisition unit 101 is constituted by an array microphone system including a plurality of microphones and acquires a plurality of pieces of ambient sound information having directivity in respective predetermined angles from the plurality of microphones.

An analysis unit 202 separates each of the plurality of pieces of ambient sound information acquired by the sound information acquisition unit 201 into first sound information and second sound information by determining whether or not each of the plurality of pieces of ambient sound information is voice spoken to the speech dialogue device 100.

The analysis unit 202 specifies the position of a speaking person on the basis of directivity of a microphone that has acquired ambient sound information including the first sound information. Note that the position of the speaking person may be calculated on the basis of a reverberation time in a room in which the microphones are used. Note that the reverberation time is provided by measuring, in advance, the reverberation time in the room in which the microphones are placed.

A sound information DB 107 stores therein the position of a speaking person and one of the first reproduction method and the second reproduction method in association with each other.

A determining unit 203 determines whether or not one of the first reproduction method and the second reproduction method is associated with the position of the speaking person specified by the analysis unit 202 by referring to the sound information DB 107.

In a case where it is determined that one of the first reproduction method and the second reproduction method is associated with the specified position of the speaking person, a reproduction control unit 206 controls a reproduction unit 105 to reproduce an audio response by using the one of the first reproduction method and the second reproduction method that is associated with the specified position of the speaking person. In a case where the first reproduction method is associated with the specified position of the speaking person, a normal reproduction control unit 204 controls the reproduction unit 105 to reproduce the audio response by using the first reproduction method having no directivity. In a case where the second reproduction method is associated with the specified position of the speaking person, an area reproduction control unit 205 controls the reproduction unit 105 to reproduce the audio response by using the second reproduction method having directivity toward only the speaking person.

In a case where it is determined that neither the first reproduction method nor the second reproduction method is associated with the specified position of the speaking person, the sound level of the first sound information and the sound level of the second sound information are compared with each other.

In a case where the determining unit 203 determines that the sound level of the first sound information is higher than that of the second sound information, the normal reproduction control unit 204 reproduces the audio response by using the first reproduction method.

In a case where the determining unit 203 determines that the sound level of the first sound information is lower than that of the second sound information, the area reproduction control unit 205 reproduces the audio response by using the second reproduction method.

The reproduction control unit 206 causes the specified position of the speaking person and one of the first reproduction method and the second reproduction method used to reproduce the audio response to be stored in association with each other in the sound information DB 107.

Figure 12:
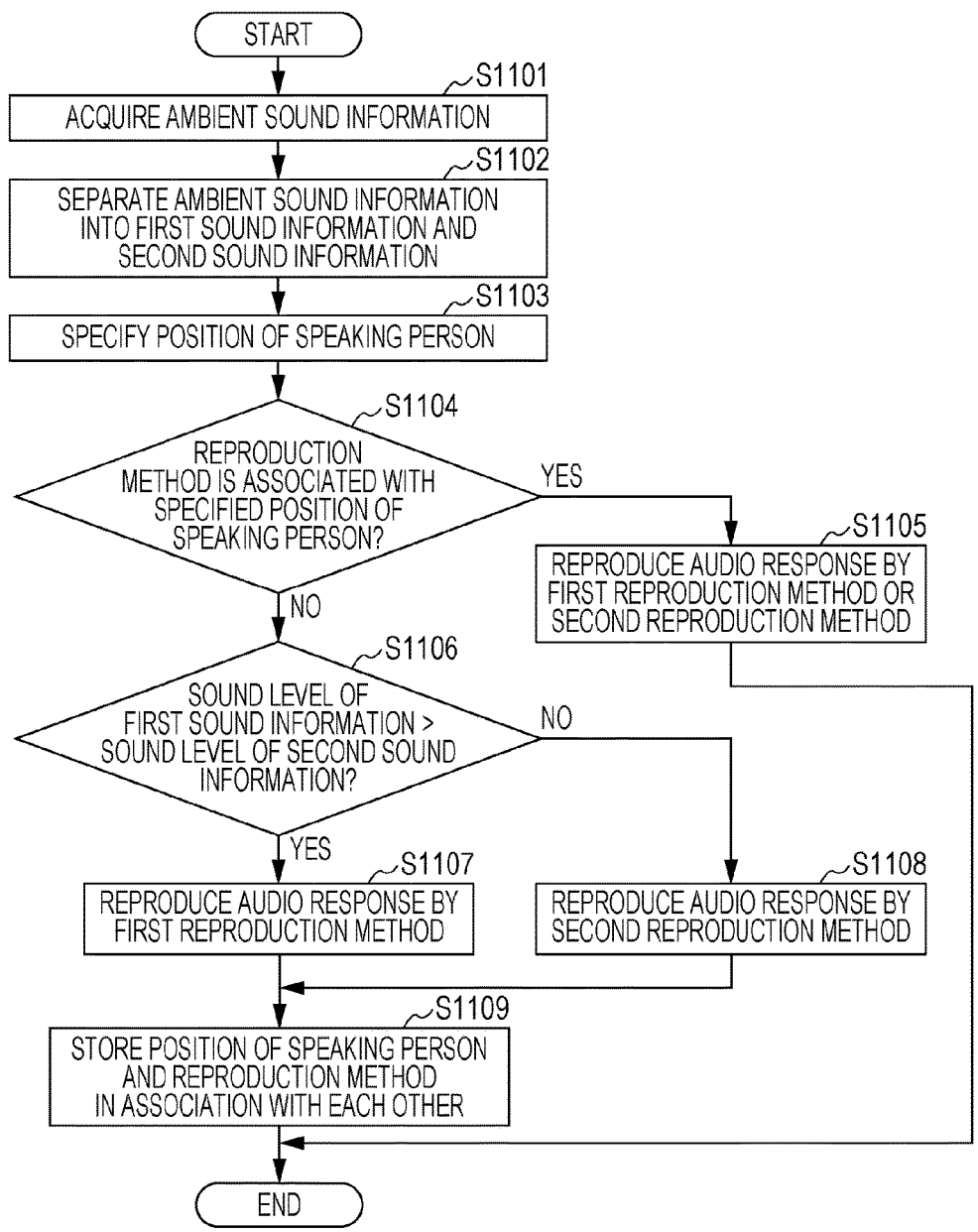
FIG. 12 is a flow chart illustrating an example of an operation of a speech dialogue device according to Modification 9 of the present embodiment.

FIG. 12 is a flow chart illustrating an example of an operation of the speech dialogue device according to Modification 9 of the present embodiment.

The processes in Step S1101 and Step S1102 are identical to those in Step S301 and Step S302 illustrated in FIG. 3, and therefore description thereof is omitted.

Next, in Step S1103, the analysis unit 202 specifies the position of a speaking person on the basis of directivity of a microphone that has acquired ambient sound information including the first sound information. Since the sound acquisition unit 101 is constituted by an array microphone system including a plurality of microphones, the analysis unit 202 can specify an arrival direction of spoken voice and can specify the position of a speaking person on the basis of the arrival direction of the spoken voice. Note that the analysis unit 202 may specify not only the position of the speaking person (a direction in which the speaking person is present), but also a region in which the speaking person is present. The region in which the speaking person is present is, for example, a range in which the speaking person can stretch his or her arms.

Next, in Step S1104, the determining unit 203 determines whether or not a reproduction method is associated with the position of the speaking person specified by the analysis unit 202 by referring to the sound information DB 107. In a case where it is determined that a reproduction method is associated with the specified position of the speaking person (YES in Step S1104), the reproduction control unit 206 controls the reproduction unit 105 to reproduce an audio response by using one of the first reproduction method and the second reproduction method that is associated with the specified position of the speaking person in Step S1105. In a case where the first reproduction method is associated with the specified position of the speaking person, the normal reproduction control unit 204 controls the reproduction unit 105 to reproduce the audio response by using the first reproduction method having no directivity. In a case where the second reproduction method is associated with the specified position of the speaking person, the area reproduction control unit 205 controls the reproduction unit 105 to reproduce the audio response by using the second reproduction method having directivity toward only the speaking person.

Meanwhile, in a case where it is determined that no reproduction method is associated with the specified position of the speaking person (NO in Step S1104), the determining unit 203 determines whether or not the sound level of the first sound information is higher than that of the second sound information in Step S1106.

Note that the processes in Step S1106 to Step S1108 are identical to those in Step S303 to Step S305 illustrated in FIG. 3, and therefore description thereof is omitted.

Next, in Step S1109, the reproduction control unit 206 causes the specified position of the speaking person and one of the first reproduction method and the second reproduction method used to reproduce the audio response to be stored in association with each other in the sound information DB 107.

Modification 10

In Modification 10 of the present embodiment, a predetermined keyword is stored in advance in a storage unit. Acquired ambient sound information is separated into first sound information and second sound information, and in a case where the first sound information includes the predetermined keyword, an audio response is reproduced by using the first reproduction method.

A configuration of a speech dialogue device 100 according to Modification 10 of the present embodiment is described with reference to FIGS. 1 and 2.

An analysis unit 202 analyzes contents of spoken voice of the separated first sound information. The analysis unit 202 converts the separated first sound information into text information.

A determining unit 203 determines whether or not the first sound information that has been converted into the text information by the analysis unit 202 includes the predetermined keyword stored in advance in the sound information DB 107. The sound information DB 107 stores therein the predetermined keyword in advance. The predetermined keyword is, for example, predetermined contents of spoken voice to be responded by an audio response reproduced by using the first reproduction method.

In a case where it is determined that the first sound information includes the predetermined keyword, a normal reproduction control unit 204 controls a reproduction unit 105 to reproduce an audio response by using the first reproduction method.

In a case where it is determined that the first sound information does not include the predetermined keyword, an area reproduction control unit 205 controls the reproduction unit 105 to reproduce the audio response by using the second reproduction method.

Figure 13:
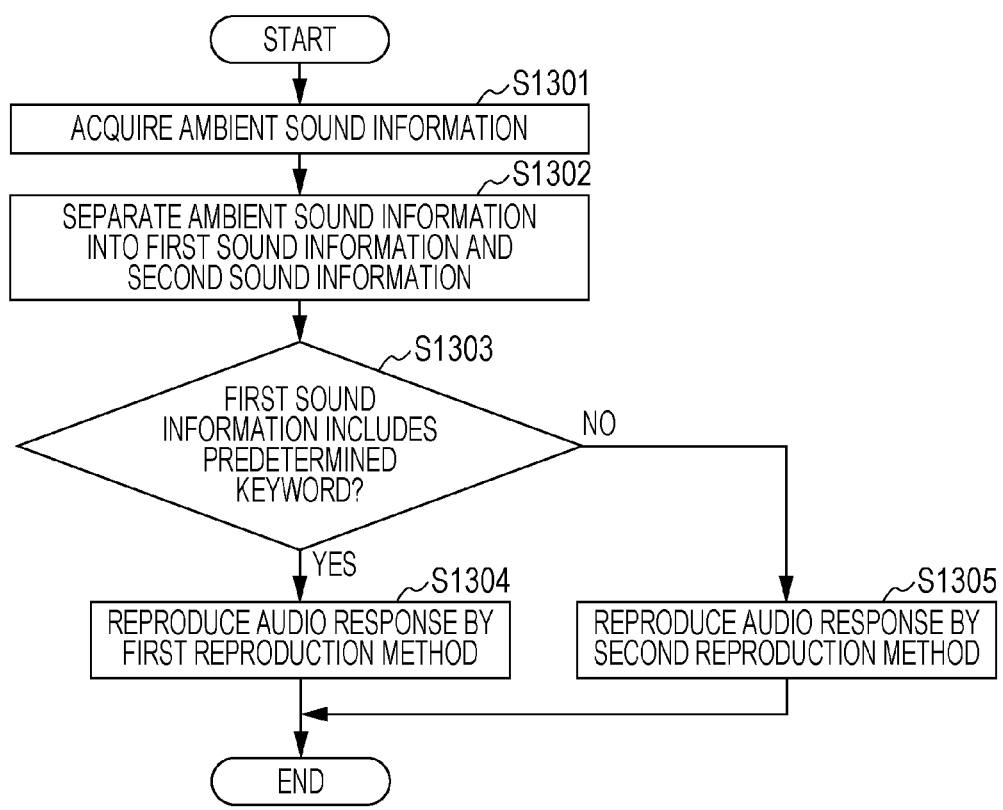
FIG. 13 is a flow chart illustrating an example of an operation of a speech dialogue device according to Modification 10 of the present embodiment.

FIG. 13 is a flow chart illustrating an example of an operation of the speech dialogue device according to Modification 10 of the present embodiment.

The processes in Step S1301 and Step S1302 are identical to those in Step S301 and Step S302 illustrated in FIG. 3, and therefore description thereof is omitted.

Next, in Step S1303, the determining unit 203 determines whether or not the first sound information includes the predetermined keyword stored in advance in the sound information DB 107. Note that the first sound information has been converted into text information by the analysis unit 202.

In a case where it is determined that the first sound information includes the predetermined keyword (YES in Step S1303), the normal reproduction control unit 204 controls the reproduction unit 105 to reproduce an audio response by using the first reproduction method having no directivity in Step S1304.

Meanwhile, in a case where it is determined that the first sound information does not include the predetermined keyword (NO in Step S1303), the area reproduction control unit 205 controls the reproduction unit 105 to reproduce the audio response by using the second reproduction method having directivity toward only a speaking person in Step S1305.

In the present embodiment, an audio response is reproduced by using the first reproduction method in a case where it is determined that the first sound information includes the predetermined keyword, and the audio response is reproduced by using the second reproduction method in a case where it is determined that the first sound information does not include the predetermined keyword. However, the present disclosure is not limited to this. It is also possible to employ an arrangement in which an audio response is reproduced by using the second reproduction method in a case where it is determined that the first sound information includes the predetermined keyword, and the audio response is reproduced by using the first reproduction method in a case where it is determined that the first sound information does not include the predetermined keyword.

Modification 11

In Modification 11 of the present embodiment, an audio response is not reproduced in a case where spoken voice of the same contents is acquired successively.

A configuration of a speech dialogue device 100 according to Modification 11 of the present embodiment is described with reference to FIGS. 1 and 2.

An analysis unit 202 analyzes contents of spoken voice of separated first sound information.

A determining unit 203 determines whether or not the contents of the spoken voice analyzed by the analysis unit 202 are the same as those of first sound information acquired last time that is stored in a sound information DB 107.

In a case where it is determined that the analyzed contents of the spoken voice are the same as those of the last one, a reproduction control unit 206 omits reproduction of an audio response.

In a case where it is determined that the analyzed contents of the spoken voice are not the same as those of the last one, the determining unit 203 compares the sound level of the first sound information with the sound level of second sound information. The reproduction control unit 206 reproduces the audio response by using one of the first reproduction method and the second reproduction method in accordance with a result of the comparison.

The reproduction control unit 206 causes the contents of the spoken voice of the first sound information acquired this time to be stored in the sound information DB 107.

Figure 14:
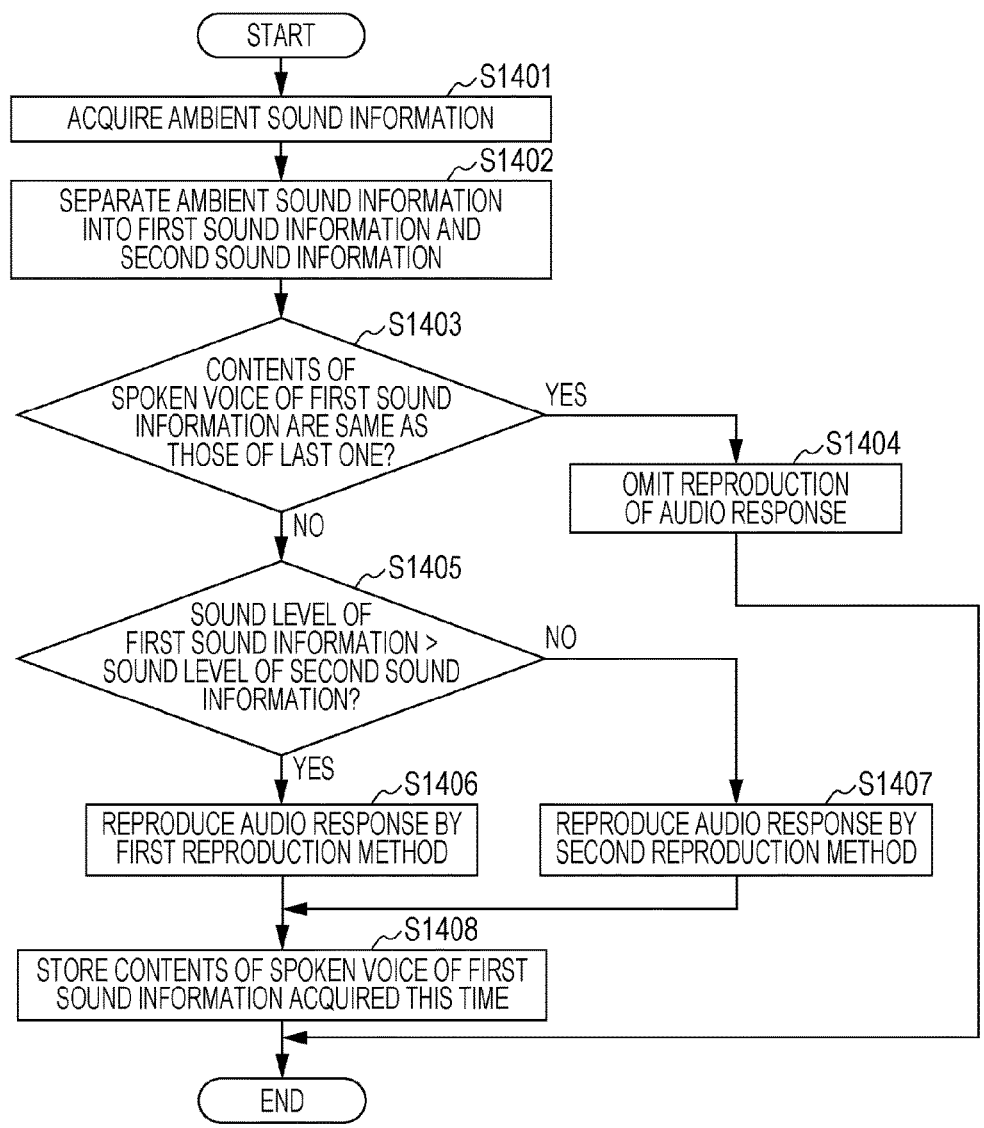
FIG. 14 is a flow chart illustrating an example of an operation of a speech dialogue device according to Modification 11 of the present embodiment.

FIG. 14 is a flow chart illustrating an example of an operation of the speech dialogue device according to Modification 11 of the present embodiment.

The processes in Step S1401 and Step S1402 are identical to those in Step S301 and Step S302 illustrated in FIG. 3, and therefore description thereof is omitted.

Next, in Step S1403, the determining unit 203 determines whether or not contents of spoken voice of first sound information are the same as those of first sound information acquired last time that is stored in the sound information DB 107. Note that the contents of the spoken voice of the first sound information are analyzed by the analysis unit 202. Cases where contents of spoken voice are the same as those of the last one include not only a case where the wording of spoken voice of a speaking person is exactly the same as that of the last one, but also a case where the meaning of spoken voice of a speaking person is the same as that of the last one.

In a case where it is determined that the contents of the spoke voice of the first sound information are the same as those of the last one (YES in Step S1403), the reproduction control unit 206 omits reproduction of an audio response in Step S1404.

Meanwhile, in a case where it is determined that the contents of the spoken voice of the first sound information are not the same as those of the last one (NO in Step S1403), the determining unit 203 determines whether or not the sound level of the first sound information is higher than that of second sound information in Step S1405.

Note that the processes in Step S1405 to Step S1407 are identical to those in Step S303 to Step S305 illustrated in FIG. 3, and therefore description thereof is omitted.

Next, in Step S1408, the reproduction control unit 206 causes the contents of the spoken voice of the first sound information acquired this time to be stored in the sound information DB 107.

Note that in Modification 11 of the present embodiment, it may be determined whether or not a predetermined period has elapsed from acquisition of the last first sound information at a timing between Step S1402 and Step S1403. In a case where it is determined that the predetermined period has elapsed from acquisition of the last first sound information, the process may proceed to Step S1405, and in a case where it is determined that the predetermined period has not elapsed from acquisition of the last first sound information, the process may proceed to Step S1403. With the arrangement, in a case where spoken voice of the same contents is successively input within a short period, reproduction of an audio response to the latter spoken voice can be omitted.

Modification 12

In Modification 12 of the present embodiment, the sound level of voice spoken by a speaking person during normal conversation is accumulated as a normal sound level in a sound level database, and in a case where the sound level of first sound information including spoken voice of an instruction to a speech dialogue device 100 is higher than an average of normal sound levels accumulated in the sound level database, an audio response is reproduced by using the first reproduction method, whereas in a case where the sound level of the first sound information is lower than the average of the normal sound levels, the audio response is reproduced by using the second reproduction method.

A configuration of the speech dialogue device 100 according to Modification 11 of the present embodiment is described with reference to FIGS. 1 and 2.

An analysis unit 202 causes the sound level of human voice included in separated second sound information to be accumulated as a normal sound level in a sound information DB 107. That is, the analysis unit 202 causes not the sound level of spoken voice of an instruction to the speech dialogue device 100 but the sound level of voice spoken by a speaking person during normal conversation to be stored as a normal sound level in the sound information DB 107.

The sound information DB 107 accumulates therein the normal sound level. Note that the sound information DB 107 may accumulate therein all of normal sound levels supplied from the analysis unit 202. The sound information DB 107 may calculate an average of the normal sound level supplied from the analysis unit 202 and a normal sound level that is already accumulated and then accumulate therein only the average thus calculated.

A determining unit 203 determines whether or not the sound level of separated first sound information is higher than the average of normal sound levels accumulated in the sound information DB 107.

In a case where it is determined that the sound level of the first sound information is higher than the average of the normal sound levels, a normal reproduction control unit 204 controls a reproduction unit 105 to reproduce an audio response by using the first reproduction method.

In a case where it is determined that the sound level of the first sound information is lower than the average of the normal sound levels, an area reproduction control unit 205 controls the reproduction unit 105 to reproduce the audio response by using the second reproduction method.

Figure 15:
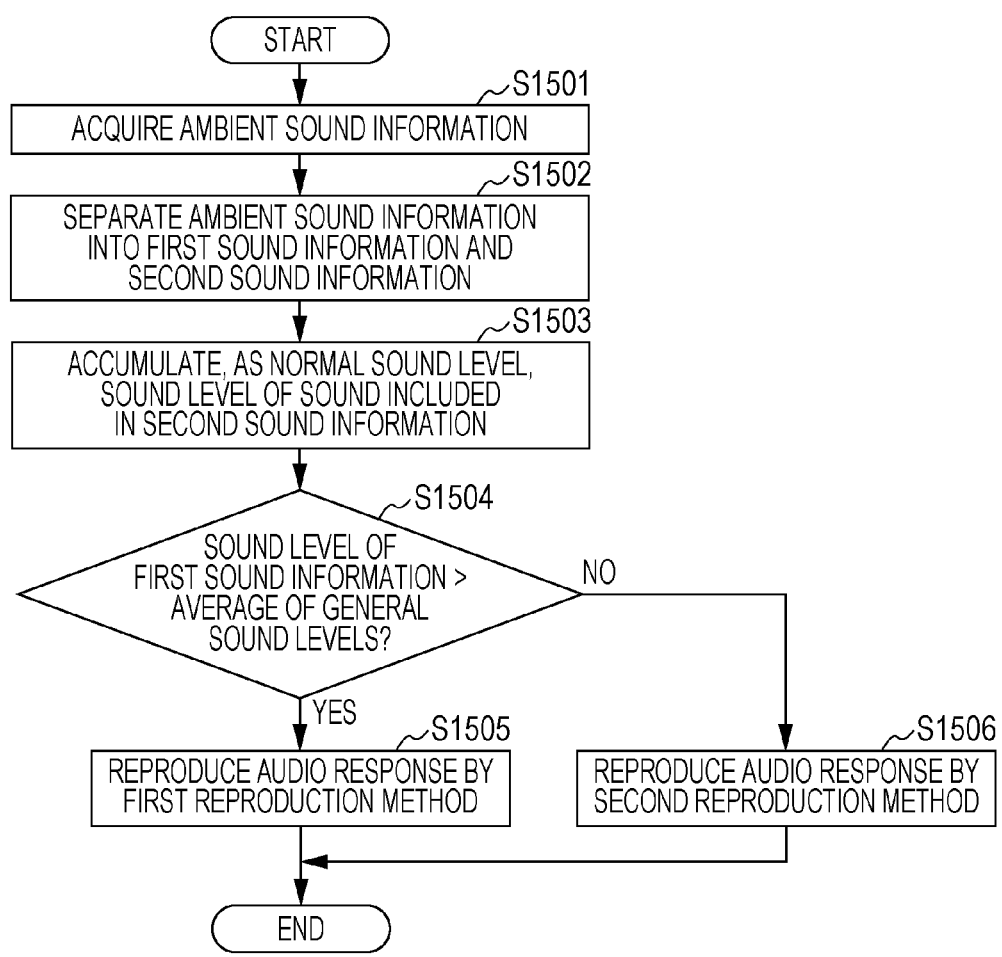
FIG. 15 is a flow chart illustrating an example of an operation of a speech dialogue device according to Modification 12 of the present embodiment.

FIG. 15 is a flow chart illustrating an example of an operation of the speech dialogue device according to Modification 12 of the present embodiment.

The processes in Step S1501 and Step S1502 are identical to those in Step S301 and Step S302 illustrated in FIG. 3, and therefore description thereof is omitted.

Next, in Step S1503, the analysis unit 202 causes the sound level of human voice included in separated second sound information to be accumulated as a normal sound level in the sound information DB 107.

Next, in Step S1504, the determining unit 203 determines whether or not the sound level of separated first sound information is higher than the average of normal sound levels accumulated in the sound information DB 107.

In a case where it is determined that the sound level of the first sound information is higher than the average of the normal sound levels (YES in Step S1504), the normal reproduction control unit 204 controls the reproduction unit 105 to reproduce an audio response by using the first reproduction method in Step S1505.

Meanwhile, in a case where it is determined that the sound level of the first sound information is lower than the average of the normal sound levels (NO in Step S1504), the area reproduction control unit 205 controls the reproduction unit 105 to reproduce the audio response by using the second reproduction method.

Note that in a case where it is determined that the sound level of the first sound information is the same as the average of the normal sound levels, the normal reproduction control unit 204 may reproduce the audio response by using the first reproduction method or the area reproduction control unit 205 may reproduce the audio response by using the second reproduction method.

It is also possible to employ an arrangement in which in a case where it is determined that the sound level of the first sound information is higher than the average of the normal sound levels, an audio response is reproduced by using the second reproduction method, and in a case where it is determined that the sound level of the first sound information is lower than the average of the normal sound levels, the audio response is reproduced by using the first reproduction method.

In the present embodiment, the reproduction unit 105 reproduces an audio response by using the first reproduction method or the second reproduction method. However, the present disclosure is not limited to this, and the reproduction unit 105 may reproduce sound reproduced by a device controlled by spoken voice by using one of the first reproduction method and the second reproduction method. For example, in a case where the speech dialogue device 100 is provided in a television set and where a speaking person has spoken an instruction to turn up the volume of the television set to the speech dialogue device 100, the speech dialogue device 100 may reproduce sound reproduced by the television set by using one of the first reproduction method and the second reproduction method in accordance with a result of comparison between the sound level of first sound information and the sound level of second sound information.

It should be noted that, in the aforementioned embodiments, the constituent elements may be configured by using dedicated hardware, or may be realized by executing a software program suitable for the constituent elements. The operations or functions of the constituent elements may be realized by a program execution unit such as a CPU or a processor reading and executing a software program recorded in a recording medium such as a hard disk or a semiconductor memory.

The data that is used when the operations or functions of the constituent elements are realized may be recorded in a writable recording medium such as a semiconductor memory or a hard disk.

A sound reproduction method, a speech dialogue device, and a recording medium according to the present disclosure make it possible to reproduce an audio response by using a reproduction method according to a situation around a speaking person, and are therefore useful as a sound reproduction method, a speech dialogue device, and a recording medium for reproducing an audio response to spoken voice.

What is claimed is:

1. A sound reproduction method in a speech dialogue system, comprising:
   acquiring ambient sound information that includes voice spoken to the speech dialogue system and indicates sound around a speaking person who has spoken the voice;
   separating the ambient sound information into first sound information including the spoken voice and second sound information including sound other than the spoken voice;
   comparing a sound level of the first sound information, which includes the spoken voice, with a sound level of the second sound information, which includes the sound other than the spoken voice; and
   reproducing an audio response to the spoken voice, to provide the speaking person with the reproduced audio response, by selecting one of a first reproduction method and a second reproduction method that is different in terms of directivity of reproduced sound from the first reproduction method in accordance with a result of the comparing,
   wherein the audio response includes a processor-synthesized audio response that contains content based on automated sound recognition of the spoken voice by the speech dialogue system to the spoken voice,
   wherein at least one of the acquiring, the separating and the comparing and the reproducing is performed by a processor, and
   wherein the reproducing is performed by a speaker.

2. The sound reproduction method according to claim 1,
   wherein the first reproduction method is a reproduction method to provide an audio response having no directivity;
   the second reproduction method is a reproduction method to provide an audio response having directivity toward the speaking person;
   the audio response is reproduced by selecting the first reproduction method in a case where the sound level of the first sound information is higher than that of the second sound information; and
   the audio response is reproduced by selecting the second reproduction method in a case where the sound level of the first sound information is lower than that of the second sound information.

3. The sound reproduction method according to claim 2,
   wherein the ambient sound information includes a plurality of pieces of ambient sound information having directivity in respective predetermined angles that are acquired from an array microphone system including a plurality of microphones; and
   each of the plurality of pieces of ambient sound information is separated into the first sound information and the second sound information by determining whether or not each of the plurality of pieces of ambient sound information is the voice spoken to the speech dialogue system.

4. The sound reproduction method according to claim 3,
   wherein in a case where the audio response is reproduced by selecting the second reproduction method, the reproduced audio response is output toward an angle in which a piece of ambient sound information determined as the voice spoken to the speech dialogue system among the plurality of pieces of ambient sound information has been acquired.

5. The sound reproduction method according to claim 3, further comprising:
   determining that the ambient sound information is voice spoken to the speech dialogue system in a case where any of the plurality of pieces of the ambient sound information includes a predetermined keyword that is stored in advance.

6. The sound reproduction method according to claim 2, further comprising:

acquiring an image around the speech dialogue system;
detecting a person who is paying attention to the speech dialogue system on the basis of the image; and
reproducing the audio response toward the detected person in a case where the audio response is reproduced by selecting the second reproduction method.

7. The sound reproduction method according to claim 1, further comprising:
performing sound recognition on the first sound information;
generating the audio response by using a result of the sound recognition; and
reproducing the audio response by selecting one of the first reproduction method and the second reproduction method.

8. The sound reproduction method according to claim 1, wherein the ambient sound information is separated into the first sound information and the second sound information by using a spectral subtraction method.

9. The sound reproduction method according to claim 1, further comprising:
identifying a person around the speech dialogue system on the basis of the ambient sound information; and
selecting one of the first reproduction method and the second reproduction method to be used to reproduce the audio response on the basis of a result of the comparing the sound level of the first sound information with the sound level of the second sound information and a result of the identifying the person around the speech dialogue system.

10. The sound reproduction method according to claim 1, wherein a reproduction method for reproducing the audio response is selected by using a table in which the first sound information acquired previously and one of the first reproduction method and the second reproduction method selected to reproduce the first sound information acquired previously are stored in association with each other.

11. The sound reproduction method according to claim 1, wherein the first reproduction method is a reproduction method to provide an audio response having no directivity; and
the second reproduction method is a reproduction method to provide an audio response having directivity toward a speaking person;
the sound reproduction method further comprises:
acquiring an image around the speech dialogue system;
detecting the number of persons who are paying attention to the speech dialogue system on the basis of the image;
determining whether or not a plurality of persons are paying attention to the speech dialogue system on the basis of a result of the detecting the number of persons;
reproducing the audio response by selecting the first reproduction method in a case where it is determined that a plurality of persons are paying attention to the speech dialogue system; and
reproducing the audio response by selecting the second reproduction method in a case where it is determined that a plurality of persons are not paying attention to the speech dialogue system.

12. The sound reproduction method according to claim 1, wherein the first reproduction method is a reproduction method to provide an audio response having no directivity; and
the second reproduction method is a reproduction method to provide an audio response having directivity toward a speaking person;

the sound reproduction method further comprises:
picking up the spoken voice by using a sound pickup device held by the speaking person;
acquiring an image around the speech dialogue system;
specifying a position of the speaking person who has spoken to the sound pickup device on the basis of the image; and
determining whether or not the spoken voice has been picked up while a predetermined instruction signal is being input to the sound pickup device by the speaking person,
reproducing the audio response by selecting the first reproduction method in a case where it is determined that the spoken voice has not been picked up while the predetermined instruction signal is being input to the sound pickup device; and
reproducing the audio response by selecting the second reproduction method in a case where it is determined that the spoken voice has been picked up while the predetermined instruction signal is being input to the sound pickup device.

13. The sound reproduction method according to claim 1, wherein the first reproduction method is a reproduction method to provide an audio response having no directivity;
the second reproduction method is a reproduction method to provide an audio response having directivity toward a speaking person; and
the ambient sound information includes a plurality of pieces of ambient sound information having directivity in respective predetermined angles that are acquired from an array microphone system including a plurality of microphones;
the sound reproduction method further comprises:
separating each of the plurality of pieces of ambient sound information into the first sound information and the second sound information by determining whether or not each of the plurality of pieces of ambient sound information is the voice spoken to the speech dialogue system;
specifying a position of the speaking person on the basis of directivity of a microphone that has acquired ambient sound information including the first sound information;
determining whether or not one of the first reproduction method and the second reproduction method is associated with the specified position of the speaking person by referring to a sound information database in which the position of the speaking person and one of the first reproduction method and the second reproduction method are stored in association with each other;
reproducing the audio response by selecting one of the first reproduction method and the second reproduction method that is associated with the specified position of the speaking person in a case where it is determined that the one of the first reproduction method and the second reproduction method is associated with the specified position of the speaking person;
comparing the sound level of the first sound information and the sound level of the second sound information in a case where it is determined that neither the first reproduction method nor the second reproduction method is associated with the specified position of the speaking person;

reproducing the audio response by selecting the first reproduction method in a case where the sound level of the first sound information is higher than that of the second sound information;

reproducing the audio response by selecting the second reproduction method in a case where the sound level of the first sound information is lower than that of the second sound information; and storing, in the sound information database, the specified position of the speaking person and the one of the first reproduction method and the second reproduction method used to reproduce the audio response in association with each other.

14. The sound reproduction method according to claim 1, further comprising:

identifying a speaking person who has spoken the voice;

selecting one of the first reproduction method and the second reproduction method that is associated with the identified speaking person in a sound information database in which information for identifying the speaking person and one of the first reproduction method and the second reproduction method are stored in association with each other; and reproducing the audio response by using the one of the first reproduction method and the second reproduction method.

15. The sound reproduction method according to claim 1, wherein the first reproduction method is a reproduction method to provide an audio response having no directivity; and the second reproduction method is a reproduction method to provide an audio response having directivity toward a speaking person;

the sound reproduction method further comprises:

determining whether or not the separated first sound information includes a predetermined keyword stored in advance in a storage;

reproducing the audio response by selecting the first reproduction method in a case where it is determined that the separated first sound information includes the predetermined keyword; and reproducing the audio response by selecting the second reproduction method in a case where it is determined that the separated first sound information does not include the predetermined keyword.

16. The sound reproduction method according to claim 1, further comprising:

analyzing contents of the spoken voice of the separated first sound information and then determining whether or not the analyzed contents of the spoken voice are the same as those of first sound information acquired last time;

omitting reproduction of the audio response in a case where it is determined that the analyzed contents of the spoken voice are the same as those of the first sound information acquired last time;

comparing the sound level of the first sound information with the sound level of the second sound information in a case where it is determined that the analyzed contents of the spoken voice are not the same as those of the first sound information acquired last time and then reproducing the audio response by selecting one of the first reproduction method and the second reproduction method in accordance with a result of the comparing; and storing the analyzed contents of the spoken voice in the storage.

17. The sound reproduction method according to claim 1, wherein the first reproduction method is a reproduction method to provide an audio response having no directivity; and the second reproduction method is a reproduction method to provide an audio response having directivity toward a speaking person;

the sound reproduction method further comprises:

accumulating, in a sound level database, a sound level of human voice included in the separated second sound information as a normal sound level;

determining whether or not the sound level of the separated first sound information is higher than an average of the normal sound level accumulated in the sound level database;

reproducing the audio response by selecting the first reproduction method in a case where it is determined that the sound level of the first sound information is higher than the average of the normal sound level; and reproducing the audio response by selecting the second reproduction method in a case where it is determined that the sound level of the first sound information is lower than the average of the normal sound level.

18. A speech dialogue device, comprising:

a sound separator that separates ambient sound information including voice spoken to the speech dialogue device and indicating sound around a speaking person who has spoken the voice into first sound information including the spoken voice and second sound information including sound other than the spoken voice;

a comparator that compares a sound level of the first sound information, which includes the spoken voice, with a sound level of the second sound information, which includes the sound other than the spoken voice; and a reproduction controller that controls a speaker to reproduce an audio response to the spoken voice, to provide the speaking person with the reproduced audio response, by selecting one of a first reproduction method and a second reproduction method that is different in terms of directivity of reproduced sound from the first reproduction method in accordance with a result of the comparison, wherein the audio response includes a processor-synthesized audio response that contains content based on automated sound recognition of the spoken voice by the spoken dialogue device to the spoken voice, and wherein at least one of the sound separator and the comparator and the reproduction controller includes a processor.

19. A non-transitory computer-readable recording medium storing a program, the program causing a computer to:

separate ambient sound information that includes voice spoken to the computer and indicates sound around a speaking person who has spoken the voice into first sound information including the spoken voice and second sound information including sound other than the spoken voice;

compare a sound level of the first sound information, which includes the spoken voice, with a sound level of the second sound information, which includes the sound other than the spoken voice; and control a speaker to reproduce an audio response to the spoken voice, to provide the speaking person with the reproduced audio response, by selecting one of a first reproduction method and a second reproduction method that is different in terms of directivity of reproduced sound from the first reproduction method in accordance with a result of the comparison,
wherein the audio response includes a computer-synthesized audio response that contains content based on automated sound recognition of the spoken voice by the computer to the spoken voice.

* * * * *